US011744400B2

(12) United States Patent
Gober

(10) Patent No.: US 11,744,400 B2
(45) Date of Patent: Sep. 5, 2023

(54) RADIANT FURNITURE

(71) Applicant: David A. Gober, Carthage, MO (US)

(72) Inventor: David A. Gober, Carthage, MO (US)

(*) Notice: Subject to any disclaimer, the term of this patent is extended or adjusted under 35 U.S.C. 154(b) by 0 days.

(21) Appl. No.: 18/051,262

(22) Filed: Oct. 31, 2022

(65) Prior Publication Data

US 2023/0080374 A1 Mar. 16, 2023

Related U.S. Application Data

(60) Division of application No. 16/596,846, filed on Oct. 9, 2019, now Pat. No. 11,596,264, which is a continuation-in-part of application No. 14/970,839, filed on Dec. 16, 2015, now Pat. No. 10,463,148.

(51) Int. Cl.
*A47J 36/24* (2006.01)

(52) U.S. Cl.
CPC ... *A47J 36/2483* (2013.01); *A47B 2200/0009* (2013.01)

(58) Field of Classification Search
CPC . A47B 2200/0009; A47B 37/04; A47C 7/748; A47J 36/2483; A47J 36/2433
See application file for complete search history.

(56) References Cited

U.S. PATENT DOCUMENTS

| | | | |
|---|---|---|---|
| 2,471,884 A | 5/1949 | Monnot | |
| 3,111,569 A | 11/1963 | Rubenstein | |
| 3,420,981 A | 1/1969 | Martinet | |
| 3,617,693 A | 11/1971 | Shimosawa | |
| 3,740,513 A | 6/1973 | Peters, Jr. et al. | |
| 3,876,202 A | 4/1975 | Allison | |
| 3,904,847 A | 9/1975 | Adams | |
| 4,088,115 A | 5/1978 | Powell | |
| 4,559,881 A | 12/1985 | Lankard et al. | |

(Continued)

FOREIGN PATENT DOCUMENTS

| | | |
|---|---|---|
| DE | 202013104029 U1 | 12/2014 |
| EP | 1554911 B1 | 3/2009 |
| KR | 2036712 B1 | 10/2019 |

OTHER PUBLICATIONS

Galanter & Jones, brochure for Heated Outdoor Furniture, 2015.

*Primary Examiner* — Dana Ross
*Assistant Examiner* — Joe E Mills, Jr.
(74) *Attorney, Agent, or Firm* — MARTIN & ASSOCIATES, LLC; Derek P. Martin

(57) ABSTRACT

Radiant furniture made of a concrete mix includes one or more heating elements or hot water supplied hydronic tubing that provide comfortable radiant heat. Tabletops can be heated to a temperature that is comfortable for people seated at the table. Benches and seats can be heated to provide comfortable heated seating. Combinations can also be used together, such as a heated tabletop with heated seats. A controller senses the temperature of the furniture and the ambient temperature, then applies power to one or more heating elements in the furniture according to programmed temperature thresholds to provide comfortable radiant heat from the furniture. The controller includes a calibration mode that allows calibrating the controller to a particular heated surface. The controller further comprises a knob that determines an operating mode for the controller and allows adjusting a temperature threshold for the heated surface up or down.

7 Claims, 18 Drawing Sheets

(56) References Cited

U.S. PATENT DOCUMENTS

| | | |
|---|---|---|
| 4,727,241 A | 2/1988 | McWilliams |
| 4,806,738 A | 2/1989 | Telamo |
| 4,899,027 A | 2/1990 | Wong |
| 5,077,460 A | 12/1991 | Rocha et al. |
| 5,138,138 A | 8/1992 | Theilacker et al. |
| 5,324,911 A | 6/1994 | Cranston et al. |
| 5,390,277 A * | 2/1995 | Van Wagner .......... F24H 9/2028 4/443 |
| 5,467,695 A | 11/1995 | Keller et al. |
| 5,752,450 A | 5/1998 | Roesner |
| 5,819,282 A | 10/1998 | Rocha et al. |
| 6,065,466 A | 5/2000 | Baykal |
| 6,302,094 B1 | 10/2001 | Wehrly et al. |
| 6,653,607 B2 | 11/2003 | Ellis et al. |
| 6,803,543 B2 | 10/2004 | Argersinger et al. |
| 6,914,221 B1 | 7/2005 | Witt et al. |
| 6,933,469 B2 | 8/2005 | Ellis et al. |
| 6,943,319 B2 | 9/2005 | Jones |
| 7,417,206 B2 | 8/2008 | Nakamura |
| 9,593,858 B2 | 3/2017 | Dellwig et al. |
| 9,675,180 B2 | 6/2017 | Currie |
| 2004/0149718 A1 | 8/2004 | Ito et al. |
| 2007/0183758 A1* | 8/2007 | Bradenbaugh ........ F24H 9/2021 122/13.01 |
| 2007/0210064 A1* | 9/2007 | Quella .................... A47J 36/02 219/451.1 |
| 2007/0267399 A1 | 11/2007 | Flores |
| 2008/0000895 A1 | 1/2008 | Herving |
| 2008/0110870 A1 | 5/2008 | Mirkes et al. |
| 2008/0245786 A1 | 10/2008 | Sharma |
| 2010/0107536 A1 | 5/2010 | Tautari et al. |
| 2010/0170422 A1 | 7/2010 | Redmond et al. |
| 2011/0174795 A1 | 7/2011 | Chen et al. |
| 2014/0034266 A1 | 2/2014 | Tabei et al. |
| 2014/0069908 A1 | 3/2014 | Yang et al. |
| 2014/0231403 A1* | 8/2014 | Stopperan ................ H05B 3/26 219/482 |
| 2014/0333010 A1 | 11/2014 | Ciuperca |
| 2015/0069664 A1 | 3/2015 | Ciuperca |

\* cited by examiner

|  | Table | Seating/No Pad | Seating/With Pad |
|---|---|---|---|
| Default (Knob ON) | 105 F (41 C) | 100 F (38 C) | 110 F (43 C) |
| Off (Knob OFF) | Off | Off | Off |
| Ambient (Knob AUTO) |  |  |  |
| Below 36 F (2 C) | Off | Off | Off |
| 36-55 F (2-13 C) | 107 F (42 C) | 100 F (38 C) | 108 F (42 C) |
| 56 F (13 C) | 107 F (42 C) | 100 F (38 C) | 108 F (42 C) |
| 57 F (14 C) | 107 F (42 C) | 100 F (38 C) | 108 F (42 C) |
| 58 F (14 C) | 107 F (42 C) | 100 F (38 C) | 108 F (42 C) |
| 59 F (15 C) | 107 F (42 C) | 100 F (38 C) | 108 F (42 C) |
| 60 F (16 C) | 107 F (42 C) | 100 F (38 C) | 106 F (41 C) |
| 61 F (16 C) | 106 F (41 C) | 99 F (37 C) | 105 F (41 C) |
| 62 F (17 C) | 105 F (41 C) | 98 F (37 C) | 105 F (41 C) |
| 63 F (17 C) | 105 F (41 C) | 98 F (37 C) | 105 F (41 C) |
| 64 F (18 C) | 104 F (40 C) | 97 F (36 C) | 104 F (40 C) |
| 65 F (18 C) | 103 F (39 C) | 96 F (36 C) | 103 F (39 C) |
| 66 F (19 C) | 102 F (39 C) | 95 F (35 C) | 102 F (39 C) |
| 67 F (19 C) | 101 F (38 C) | 94 F (34 C) | 101 F (38 C) |
| 68 F (20 C) | 100 F (38 C) | 93 F (34 C) | 100 F (38 C) |
| 69 F (21 C) | 99 F (37 C) | 92 F (33 C) | 99 F (37 C) |
| 70 F (21 C) | 98 F (37 C) | 91 F (33 C) | 98 F (37 C) |
| 71 F (22 C) | 97 F (36 C) | 90 F (32 C) | 97 F (36 C) |
| 72 F (22 C) | 96 F (36 C) | 89 F (32 C) | 96 F (36 C) |
| 73 F (23 C) | 95 F (35 C) | 88 F (31 C) | 95 F (35 C) |
| 74 F (23 C) | 94 F (34 C) | 87 F (31 C) | 94 F (34 C) |
| 75 F (24 C) | 93 F (34 C) | 86 F (30 C) | 92 F (33 C) |
| 76 F (24 C) | 92 F (33 C) | 85 F (29 C) | 92 F (33 C) |
| 77 F (25 C) | 90 F (32 C) | 83 F (28 C) | 90 F (32 C) |
| 78 F (26 C) | 88 F (31 C) | 81 F (21 C) | 88 F (31 C) |
| 79 F (26 C) | 86 F (30 C) | 79 F (26 C) | 86 F (30 C) |
| 80 F (27 C) | 84 F (29 C) | 77 F (25 C) | 84 F (29 C) |
| 81 F (21 C) | 83 F (28 C) | 76 F (24 C) | 83 F (28 C) |
| 82 F (28 C) | 82 F (28 C) | 75 F (24 C) | 83 F (28 C) |
| 83 F (28 C) | 80 F (27 C) | 73 F (23 C) | 81 F (21 C) |
| 84 F (29 C) | 80 F (27 C) | 73 F (23 C) | 80 F (27 C) |
| 85 F (29 C) | 80 F (27 C) | 73 F (23 C) | 80 F (27 C) |
| 86 F (30 C) | Off | Off | Off |
| 87 F (31 C) | Off | Off | Off |
| Above 87 F (31 C) | Off | Off | Off |

FIG. 14

RADIANT FURNITURE

BACKGROUND

1. Technical Field

This disclosure generally relates to furniture, and more specifically relates to furniture that radiates heat.

2. Background Art

Many restaurants include outside seating. When the weather is cool or cold, portable space heaters are often used to keep the outside diners warm. For example, large, umbrella-shaped propane heaters are often used to keep the outside dining area warm when the temperature outside is cool or cold. A problem with these types of heaters is people closest to the heaters are often too warm and people a little farther away from the heaters are often too cold. This is because these heaters are designed to heat a given space, not specifically people within the space. In addition, these heaters can be expensive to run, hot to the touch and therefore a burn hazard, difficult to light, require periodic maintenance, etc. There exists a need for a heater that provides comfortable heat for people in a given space without the drawbacks mentioned above, in both commercial and home patio settings.

SUMMARY

Radiant furniture made of a concrete mix includes one or more heating elements or hot water supplied hydronic tubing that provide comfortable radiant heat. Tabletops can be heated to a temperature that is comfortable for people seated at the table. Other tabletops can be heated to a lower temperature for use in a greenhouse. Benches and seats can be heated to provide comfortable heated seating. Combinations can also be used together, such as a heated tabletop with heated seats. A controller senses the temperature of the furniture and the ambient temperature, then applies power to one or more heating elements in the furniture according to programmed temperature thresholds to provide comfortable radiant heat from the furniture. The controller includes a calibration mode that allows calibrating the controller to a particular heated surface. The controller further comprises a knob that determines an operating mode for the controller and allows adjusting a temperature threshold for the heated surface up or down.

The foregoing and other features and advantages will be apparent from the following more particular description, as illustrated in the accompanying drawings.

BRIEF DESCRIPTION OF THE DRAWING(S)

The disclosure will be described in conjunction with the appended drawings, where like designations denote like elements, and:

FIG. 14 is a table of temperatures for three different operating modes for the controller logic, including temperature thresholds for when the knob is in the ON position, and for a number of different ambient temperatures when the knob is between the OFF and the ON position;

DETAILED DESCRIPTION

The disclosure and claims herein relate to radiant furniture made of a concrete mix that includes one or more heating elements or hot water supplied hydronic tubing that provide comfortable radiant heat. Tabletops can be heated to a temperature that is comfortable for people seated at the table. Other tabletops can be heated to a lower temperature for use in a greenhouse. Benches and seats can be heated to provide comfortable heated seating. Combinations can also be used together, such as a heated tabletop with heated seats. A controller senses the temperature of the furniture and the ambient temperature, then applies power to one or more heating elements in the furniture according to programmed temperature thresholds to provide comfortable radiant heat from the furniture.

Figure 1:
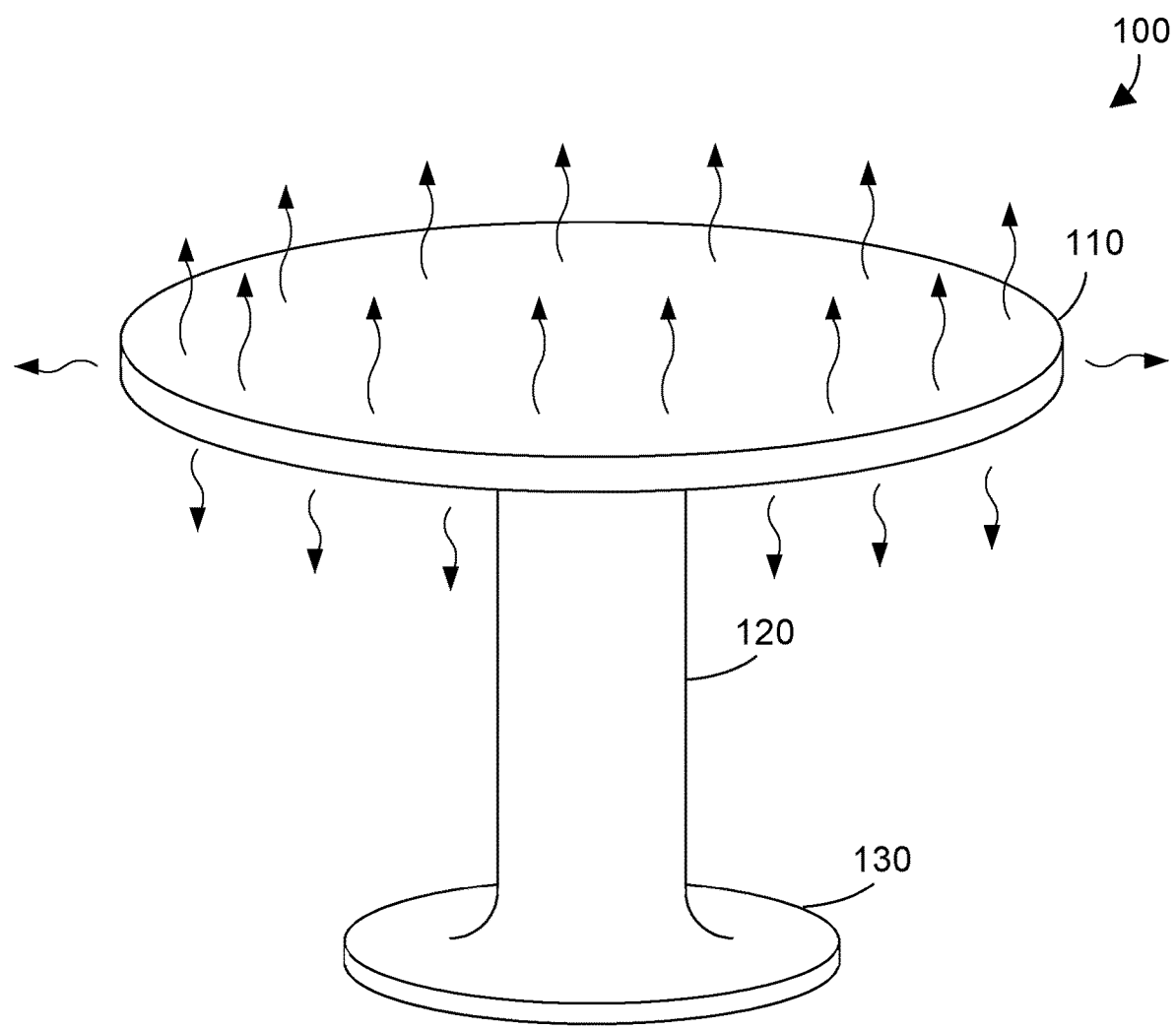
FIG. 1 is a perspective view of a table with a tabletop that radiates heat.

Referring to FIG. 1, a table 100 includes a radiant tabletop 110 that radiates heat in all directions, as shown by the arrows emanating from the tabletop 110. The tabletop 110 is connected to a support 120 that is connected to a base 130. Providing a radiant tabletop 110 allows a person seated at the table to maintain a comfortable temperature. If the person feels cold, the person can move closer to the tabletop 110 or lean over the tabletop 110 to take advantage of the heat radiating from the tabletop 110. If the person feels warm, the person can sit back in his or her chair farther away from the tabletop 110 to be farther away from the radiant tabletop 110. A table 100 with a radiant tabletop 110 thus allows a user to easily regulate the amount of heat they feel by moving closer to or farther from the radiant tabletop 110.

Radiant tabletop 110 is preferably made of a concrete mix. Concrete is a preferred material for radiating heat. The term "concrete mix" as used herein means any mix that includes a dry powder binder (such as Portland cement) that together with a liquid forms a paste that is combined with sand and/or aggregate of any suitable size. One preferred mix is marketed under the brand name enCOUNTER, which is a specialized concrete mix generally used to make concrete kitchen countertops. This mix has a specified compression strength of 8,700 pounds per square inch (psi) (612 kg per square cm). The enCOUNTER, concrete mix provides heavy density, high strength radiant furniture with no warping or long-term cracking issues. Bags of enCOUNTER are 50 lb (22.7 kg), and are available in either gray or white. The white enCOUNTER mix has less coarse aggregate than the gray enCOUNTER mix. One suitable mix for the radiant furniture is:

50 lb (22.7 kg) enCOUNTER mix
82 to 90 fluid ounces (2.4 to 2.7 liters) water

Other ingredients could be added to the mix, including plasticizer and structural fiber. A suitable plasticizer is enFLOW plasticizer, and a suitable structural fiber is enFORCE. The enCOUNTER mix, enFLOW plasticizer and enFORCE fibers are all made by the same company as part of the enCOUNTER product line, and are available from Cimarron Wholesale in Oklahoma City, Okla. One suitable mix for the radiant furniture that includes the plasticizer and structural fiber is:

50 lb (22.7 kg) enCOUNTER mix
64 to 72 fluid ounces (1.9 to 2.1 liters) water
1 fluid ounce (0.03 liter) enFLOW plasticizer
2 dry ounces (60 grams) enFORCE structural fibers Other alternatives could be used instead of the enCOUNTER mix, including Xtreme Countertop available from SureCrete Design in Dade City, Fla.; Sakrete 5000 available from Bonsal American, Inc. in Charlotte, N.C.; and Cheng Pro-Formula Concrete Countertop Mix available from store.concreteexchange.com.

Of course, a suitable mix for the radiant furniture could be made without using one of the commercially-available mixes above. One suitable mix for the radiant furniture is:

10 lb (4.5 kg) Portland cement
14 lb (6.4 kg) sand (or fine aggregate of several sizes)
12.5 lb (5.7 kg) coarse aggregate (such as white limestone)
2.5 to 4.8 lb (1.1 to 2.2 kg) water One suitable enhancement to the mix above is the addition of metakaolin, which is a dehydroxylated form of the clay mineral kaolinite. Metakaolin is generally considered a replacement for Portland cement, at a proportion of 8-20% of the weight of the cement. Metakaolin can increase both the compressive and flexural strength of concrete. A suitable mix for the radiant furniture that includes metakaolin is:

9 lb (4.1 kg) Portland cement
1 lb (0.5 kg) metakaolin
14 lb (6.4 kg) sand (or fine aggregate of several sizes)
12.5 lb (5.7 kg) coarse aggregate (such as white limestone)
2.5 to 4.8 lb (1.1 to 2.2 kg) water While several specific formulations of the concrete mix are disclosed above, one of ordinary skill in the art will realize that a suitable concrete mix can have ingredients with weights or proportions that vary from those disclosed above. For example, the weight or proportion of each ingredient could preferably vary by as much as 30% in accordance with the disclosure and claims herein. The weight or proportion of each ingredient could more preferably vary by as much as 20% in accordance with the disclosure and claims herein. The weight or proportion of each ingredient could still more preferably vary by as much as 10% in accordance with the disclosure and claims herein. And the specific weights and proportions disclosed above are the most preferred weights and proportions for the concrete mix.

The support 120 and base 130 could be made of any suitable material capable of structurally supporting the tabletop 110, including concrete, wood, metal, or any other natural, synthetic or composite material. In one particular implementation, the support 120 and base 130 are made of the same concrete mix as the tabletop 110. To keep from losing heat, the tabletop 110 can be thermally insulated from the support 120. In the alternative, the tabletop 110 can be thermally coupled to support 120, which will allow heat to travel from the tabletop 110 into the top portion of the support 120.

A concrete mix is the preferred material for radiant tabletop 110 because a concrete mix can provide the thermal mass and heat conduction properties that work well when embedding heating elements in the concrete mix. In the most preferred implementation, the concrete mix is a high-strength concrete mix that has a compressive strength of at least 6,000 psi (422 kg per square cm). Note, however, that many other suitable materials could be used, including without limitation both natural and synthetic materials. For example, an epoxy resin or polyurethane could be used instead of a concrete mix, but may provide less heat conduction when compared to a concrete mix when they have less density than a concrete mix. The disclosure and claims herein expressly extend to the use of any suitable material for the heated surface of radiant furniture. When a concrete mix is used for the heated surface, the concrete mix provides a concrete substrate into which a heating element and a temperature sensor may be embedded to form the heated surface.

Figure 2:
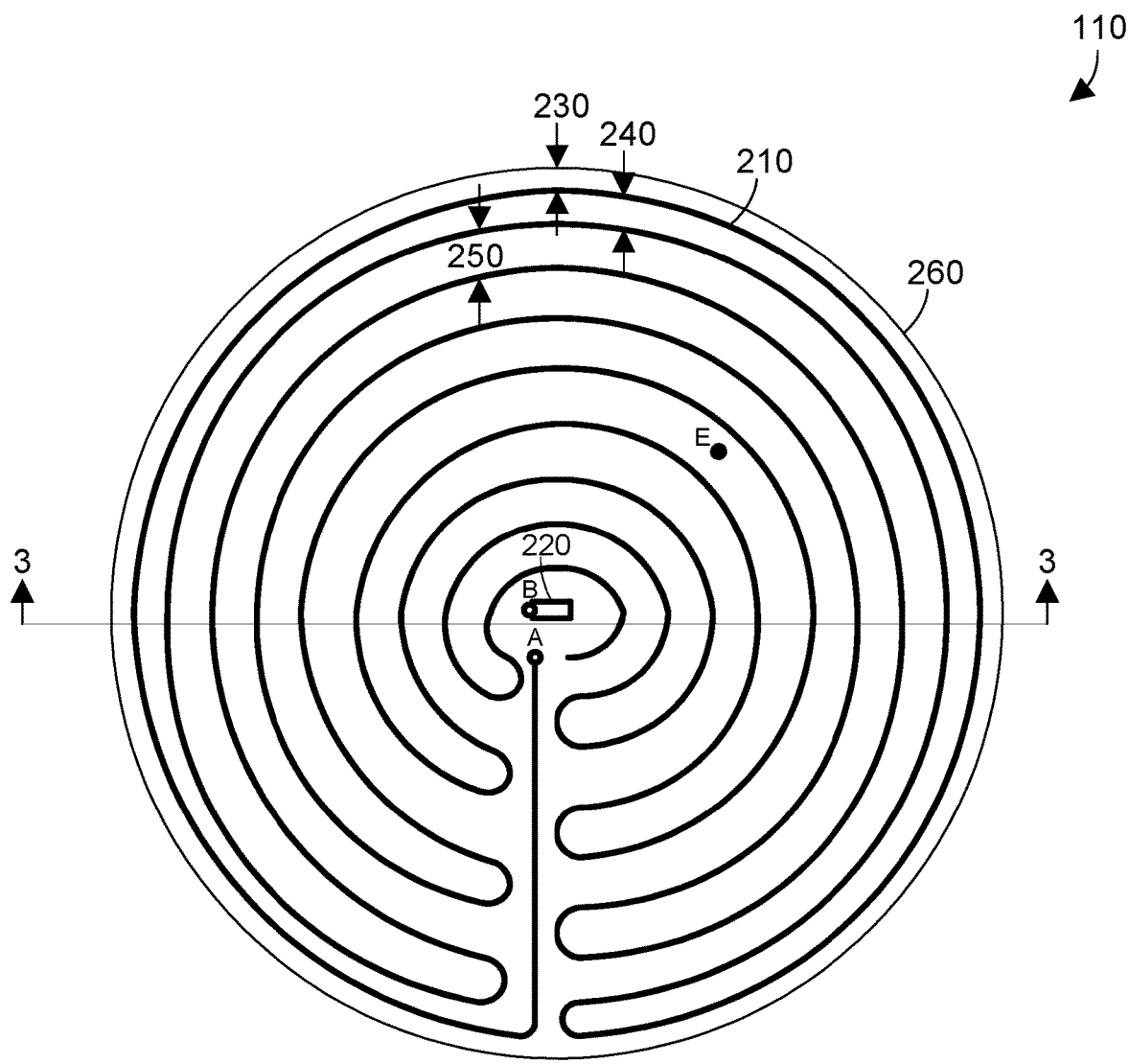
FIG. 2 is a bottom view of the tabletop shown in FIG. 1 showing a single heating element embedded within the concrete mix of the tabletop.

The radiant heat in the tabletop 110 is created by applying power to one or more heating elements embedded within the concrete mix of the tabletop 110. FIG. 2 shows a bottom view of the tabletop 110 without most of the concrete so the heating element 210 is visible. Heating element 210 is most preferably a conduction heating element that produces heat by current passing through one or more resistive elements, causing the heating element to radiate heat. Heating element 210 is preferably a commercially-available heating cable that is manufactured by Watts Water Technologies in Springfield, Mo. as ProMelt model number SC50120008 for a 29 ft cable and SC50120053 for a 208 ft cable, with other lengths available in between these two lengths. This product is used for ice-melt applications in flatwork, so sidewalks, driveways, etc. can have snow or ice easily cleared by heating the heating cable embedded in the sidewalk or driveway. The heating element 210 is preferably designed for single-phase operation. Thus, for applications in the United States, the heating element 210 is preferably designed to be powered by a 120 volt alternating-current power source. Of course, other voltages could also be used, and two-phase or three-phase or direct-current (DC) power could also be used within the scope of the disclosure and claims herein. The specified minimum bend radius is one inch (25 mm). When the heating element is spaced at 3 in. (7.6 cm) centers, it is rated at 50 watts per square foot (540 watts per square meter). When spaced at 2 in. (5.1 cm) centers, it is rated for 75 watts per square foot (810 watts per square meter). The spacing of the heating element within the tabletop 210 can thus be varied to create different tabletops with different heating properties. For example, a table used in a greenhouse for sprouting plants may need to maintain a temperature of only 80 degrees Fahrenheit (27 degrees Celsius), while a table used in an outside area of a restaurant may need to maintain a temperature of 105 degrees Fahrenheit (41 degrees Celsius). Different tabletops could be designed with different spacing of the heating element, thereby providing a designed amount of heating based on the spacing of the heating element. Tabletops can also include multiple heating elements, as discussed in more detail below. The preferred heating element includes a foil shield, a braided copper ground plane, a high temperature covering for the two individual elements preferably made of Ethylene tetrafluoroethylene (ETFE), with the individual elements made of a low-oxygen copper alloy.

Variations other than the commercially-available heating cable from ProMelt referenced above can also be used. For example, while the ProMelt heating cable has a polyurethane outer jacket, this outer jacket is not needed for the radiant furniture disclosed herein. This polyurethane outer jacket is provided in the ProMelt heating cable to make the heating cable rugged enough to walk on after installation, which is typically done as concrete is poured over the heating cable in driveways and sidewalks. Because the heating cable in the tabletop disclosed herein need not be walked on, the polyurethane jacket can be omitted.

FIG. 2 shows the heating element 210 is one continuous coil that includes several runs, with a single point A that represents an exit point to tabletop 110 for electrical connections connected to the heating element 210. In the most preferred implementation, an electrical cable is connected to the heating element 210 at connection points that are embedded within the tabletop 110, with the cable passing out of the tabletop 110 at point A to be connected to a controller. In the most preferred implementation, heating element 210 includes two individual elements that are electrically insulated and run in parallel, and are suitably terminated at the far end opposite the electrical connections by electrically connecting the two. Applying power between the two connections to the heating element 210 results in turning on the heating element 210, while removing power between the two connections results in turning off the heating element 210. The outer-most run of the heating element 210 is preferably spaced relatively close to the outer edge 260 of the tabletop to provide effective heating right at the edge of the tabletop. In one suitable implementation, the heating element 210 is placed at 0.5 inch (13 mm) from the outer edge 260 of the tabletop 110, or from the edge of other radiant furniture.

In the preferred implementation, the spacing between the runs of the heating element is closer together near the outer edge 260 of the tabletop 110 than it is farther towards the middle of the tabletop. Thus, a spacing 240 between the two outside runs of the heating element is less than the spacing 250 between the second and third runs of the heating element. Thus, the outside edge of the tabletop 110 could have a spacing of the heating element that provides 90 watts per square foot (970 watts per square meter), while the spacing of the heating element past the first two or three runs of the heating element could have a spacing of the heating element that provides a lower wattage per square foot, such as 75 watts per square foot (810 watts per square meter) or even 50 watts per square foot (540 watts per square meter). Providing a higher density of heating element in the outer edge is desirable because the outer edge loses heat more quickly than the interior of the tabletop 110. The higher density of heating element in the outer edge thus provides better heating performance by providing more heat at the exact location where more heat is lost from the tabletop. In addition, the outer edge of the tabletop is where a person sits, so the higher density of heating element in the outer edge provides more heat at the location where the person most benefits from it. In the most preferred implementation, the density of heating element 210 near the outer edge 260 of the tabletop 110 is preferably at least 20% greater than the density of heating element 210 at a midpoint between the outer edge 260 and the center of the table, shown in FIG. 2 as point E. Of course, the density of heating element 210 near the outer edge could be much more than 20% greater. For example, the density of heating element 210 near the outer edge 260 could be 100% greater, or twice the density, compared to a more interior portion like point E in FIG. 2. Thus, the heating element 210 could be spaced 1.5 inches (3.8 cm) apart for the first one or two runs, then could be spaced 3 in. (7.6 cm) apart for the more interior runs on the tabletop.

A temperature sensor 220 is preferably embedded in the tabletop 110 with point B representing an exit point for two electrical connections connected to the embedded temperature sensor 220. In the most preferred implementation, wires are connected to the temperature sensor, and the temperature sensor and connections are all embedded within the tabletop 110, with the wires exiting the tabletop 110 at point B for connection to a controller. One suitable implementation of the temperature sensor 220 is a thermistor, but any suitable temperature sensor could be used. One suitable thermistor is part number 1309007-044 manufactured by Ranco of Plain City, Ohio as part of the ETC family of electronic temperature controls, which is available from AllPoints Foodservice Parts & Supplies in Orlando, Fla. In addition, while the preferred implementation has the temperature sensor embedded within the concrete mix of the tabletop 110, the temperature sensor could instead be thermally coupled to the tabletop 110 without being embedded within the concrete mix of the tabletop 110. Furthermore, while the temperature sensor 220 is shown near the center of tabletop 110, it could instead be place at or near the outer edge 260 of tabletop 110 so it can more accurately measure temperature near a person seated at the table. The disclosure and claims herein expressly extend to any suitable location for the temperature sensor 220.

Figure 3:
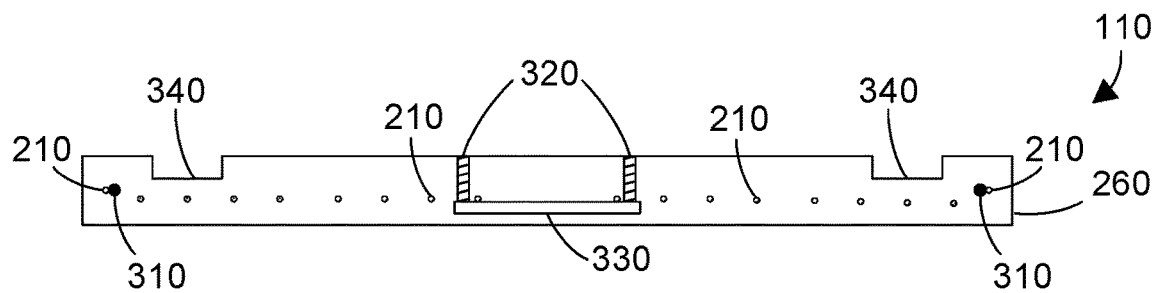
FIG. 3 is a cross-sectional view of the tabletop in FIG. 2 taken along the line 3-3.

FIG. 3 shows a cross-sectional view of the tabletop 110 in FIG. 2 taken along the lines 3-3. In this specific implementation, the tabletop 110 includes a reinforcing member 310, such as rebar. The reinforcing member 310 is placed near the outer edge 260 of the tabletop 110 to provide strength at the outer edge 260 of the tabletop 310. Note the outer run of the heating element 210 could be both mechanically and thermally coupled to the reinforcing member 310 to enhance the thermal transfer of heat from the heating element 210 to the concrete mix in the tabletop 110. Note the various runs of the heating element shown in FIG. 2 are represented in cross-section as small circles in FIG. 3, with some of these labeled 210 in FIG. 3.

A wire mesh not shown in FIG. 3 could be used in addition to or as the reinforcing member 310. The wire mesh could be a 2 inch×4 inch (5.1 cm×10 cm) or in a 4 inch×4 inch (10 cm×10 cm) wire mesh. Of course, other sizes of wire mesh could also be used. In addition to giving the tabletop additional structural strength, the wire mesh provides a support for attaching the heating element in the desired position so the heating element stays in the desired position while pouring the concrete mix. For example, the heating element could be attached to the wire mesh at various locations using wire ties.

The tabletop 110 preferably includes a structural support 330 embedded in the concrete mix that provides one or more attachment points for attaching a support for the tabletop 110. The structural support 330 is shown with threaded members 320 that provide anchors for attaching the support 120 to the tabletop 110 using a plurality of bolts. The structural support 330 could be, for example, a metal bracket with metal threaded members 320 attached to the metal bracket using bolts or welds. Once embedded in the concrete mix of the tabletop 110, the structural support 330 becomes a solid anchor point for attaching the support 120 to the tabletop 110.

One can appreciate from the cross-sectional view of the tabletop 110 in FIG. 3 how this tabletop 110 can be formed of a concrete mix. A circular form that has a bottom and sides can be used. A circular ring of rebar or other reinforcing member 310 could be installed near the outer edge of the form. The heating element 210 and temperature sensor 220 can be installed within the form as shown in FIG. 2. The heating element 210 could be structurally and thermally coupled to the reinforcing member 310 using wire zip ties, or other attachments. The heating element 210 could be spaced from the bottom and sides of the form and from different runs of itself using any suitable spacer, such as plastic spacers. The structural support 330 is also placed within the form, and may be spaced from the bottom of the form using one or more suitable spacers, such as plastic spacers. A decorative material such as aggregate or glass may be placed at the bottom of the form. In the alternative, no decorative material is used. Concrete is then poured into the form, which flows around the heating element 210 and structural support 330 to the bottom of the form until the form is filled. A circular spacer could be used to create the indentions 340 shown in FIG. 3 by embedding the circular spacer into the wet concrete. The form may then be vibrated to eliminate all bubbles and voids in the concrete mix. The concrete is then left in the form to harden. When the concrete is removed from the form, it has the cross-sectional appearance shown in FIG. 3. Making the tabletop out of a concrete mix allows numerous known techniques for decorative concrete to be used. For example, decorative material could be placed at the bottom of the form, which produces a tabletop with the decorative material on the top of the tabletop. The concrete surface of the tabletop could also be ground or stained to achieve a decorative look. Proper decorative techniques can produce tabletops that appear to be made of granite, marble or other stone. The disclosure and claims herein expressly extend to any and all finishes and looks that could be put on radiant furniture.

Figure 4:
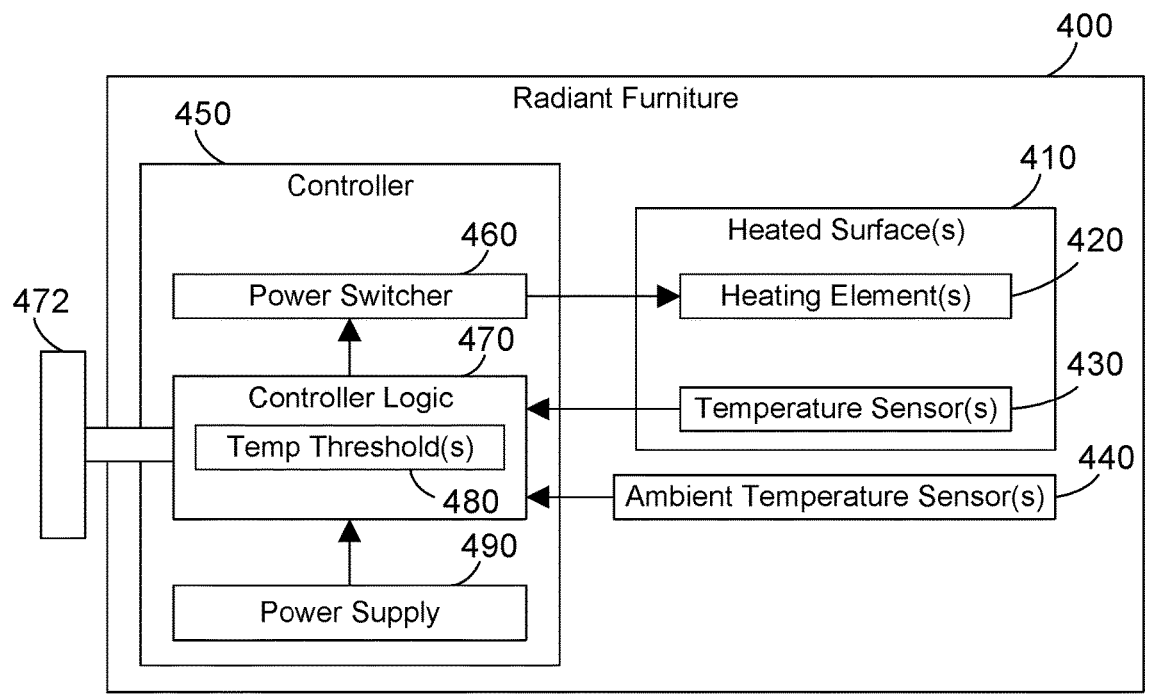
FIG. 4 is a block diagram of radiant furniture that uses electric conduction heating elements.

Referring to FIG. 4, a block diagram shows various components of radiant furniture 400. Table 100 shown in FIGS. 1-3 is one suitable example of radiant furniture 400. Radiant furniture 400 includes one or more heated surfaces 410 that preferably include one or more heating elements 420 and one or more temperature sensors 430. The radiant furniture 400 also includes a controller 450 that includes a power switcher 460, controller logic 470 and a power supply 490. The power switcher 460 is any suitable means for applying power to the heating element(s) 420. One suitable implementation for power switcher 460 is a relay that selectively applies power to or removes power from the heating element(s) 420 under control of the controller logic 470. Another suitable implementation for power switcher 460 is a power transistor. Of course, other implementations for power switcher 460 are within the scope of the disclosure and claims herein. The controller logic 470 includes one or more temperature threshold(s) 480 that determine when the controller logic 470 activates the power switcher 460 to apply power to the heating element(s) 420, and deactivates the power switcher 460 to remove power from the heating element(s) 420. The power supply 490 preferably provides power for the controller logic 470 as well as power routed through the power switcher 460 to the heating element(s) 420. The radiant furniture 400 may optionally include a knob 472 or other control that allows a user to adjust the temperature threshold(s) 480 to vary the heat produced by the radiant furniture 400 according to the user's preference. For example, in one suitable implementation, turning the knob 472 all the way in one direction will increase the temperature threshold(s) 470 to be four degrees warmer, while turning the knob 472 all the way in the opposite direction will decrease the temperature threshold(s) 470 to be four degrees cooler. Of course, any suitable adjustment mechanism could be used to allow a user of the radiant furniture to adjust the temperature threshold(s) 480 by any suitable amount. Suitable adjustment mechanisms include without limitation knobs, push-buttons, a membrane keypad, a remote control, etc.

Controller 450 can control a single heated surface 410. Controller 450 can also control multiple heated surfaces 410, either within a single piece of radiant furniture or across multiple pieces of radiant furniture. FIG. 4 shows heated surface(s) 410 with heating element(s) 420 and temperature sensor(s) 430 to represent that controller 450 can control multiple heated surfaces in one piece of radiant furniture (such as a picnic tabletop and bench seats) or multiple heated surfaces in multiple pieces of radiant furniture (such as multiple tables at a restaurant).

One suitable implementation of controller 450 is commercially-available controller made by Ranco of Plain City, Ohio as part number ETC-141000-000. This is a NEMA type 4X microprocessor-based electronic temperature controller. This controller allows setting the unit for Fahrenheit or Celsius scale, allows setting a Setpoint Temperature (which corresponds to a temperature threshold as disclosed herein), allows for setting a differential temperature to determine at what temperature the controller turns on power after turning off power when the Setpoint Temperature is reached, and allows setting the unit for cooling or heating mode. Of course, many other controllers, both commercially-available and custom-made, could also be used within the scope of the disclosure and claims herein.

Figure 5:
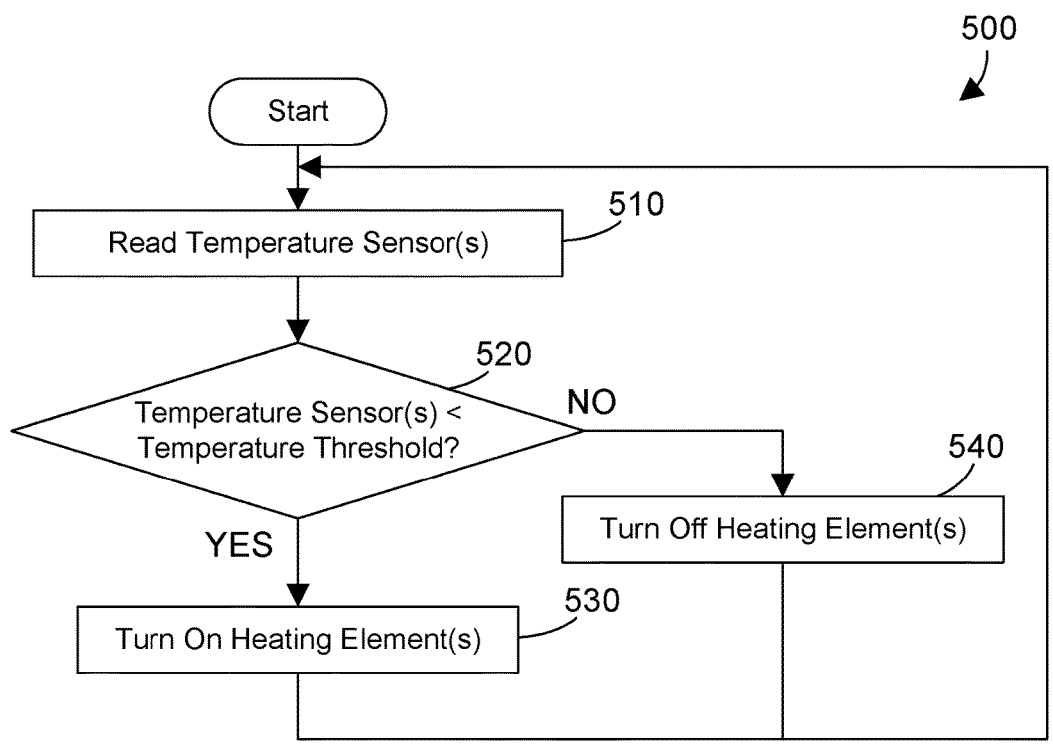
FIG. 5 is a flow diagram of a method for a controller to control radiant furniture that includes a single heating element, such as the tabletop shown in FIGS. 1-3.

FIG. 5 shows one suitable method 500 for the controller 400 to function for radiant furniture that includes one heating element, such as table 100 shown in FIGS. 1-3. The temperature sensor(s) are read (step 510). The temperature sensor(s) read in step 510 are temperature sensors 430 that sense the temperature of the heated surface(s) 410. In one suitable implementation, when multiple temperature sensors are used in a single heated surface, the temperatures provided by the multiple temperature sensors can be averaged to provide an average temperature between the multiple temperature sensors. When the temperature sensor senses a temperature of the heated surface 410 that is less than a defined temperature threshold (step 520=YES), the controller turns on the heating element(s) (step 530). Turning on the heating element(s) means the controller activates the power switcher 460 to apply power to the heating element(s) 420. When the temperature sensor senses a temperature of the heated surface 410 that is not less than the temperature threshold (step 520=NO), the controller turns off the heating element(s) (step 540). Method 500 thus turns on the heating element(s) when the temperature of the heated surface is less than a desired threshold temperature, and turns off the heating element(s) when the temperature is at or above the desired threshold temperature, thereby keeping the temperature of the heated surface near the desired threshold temperature.

Figure 6:
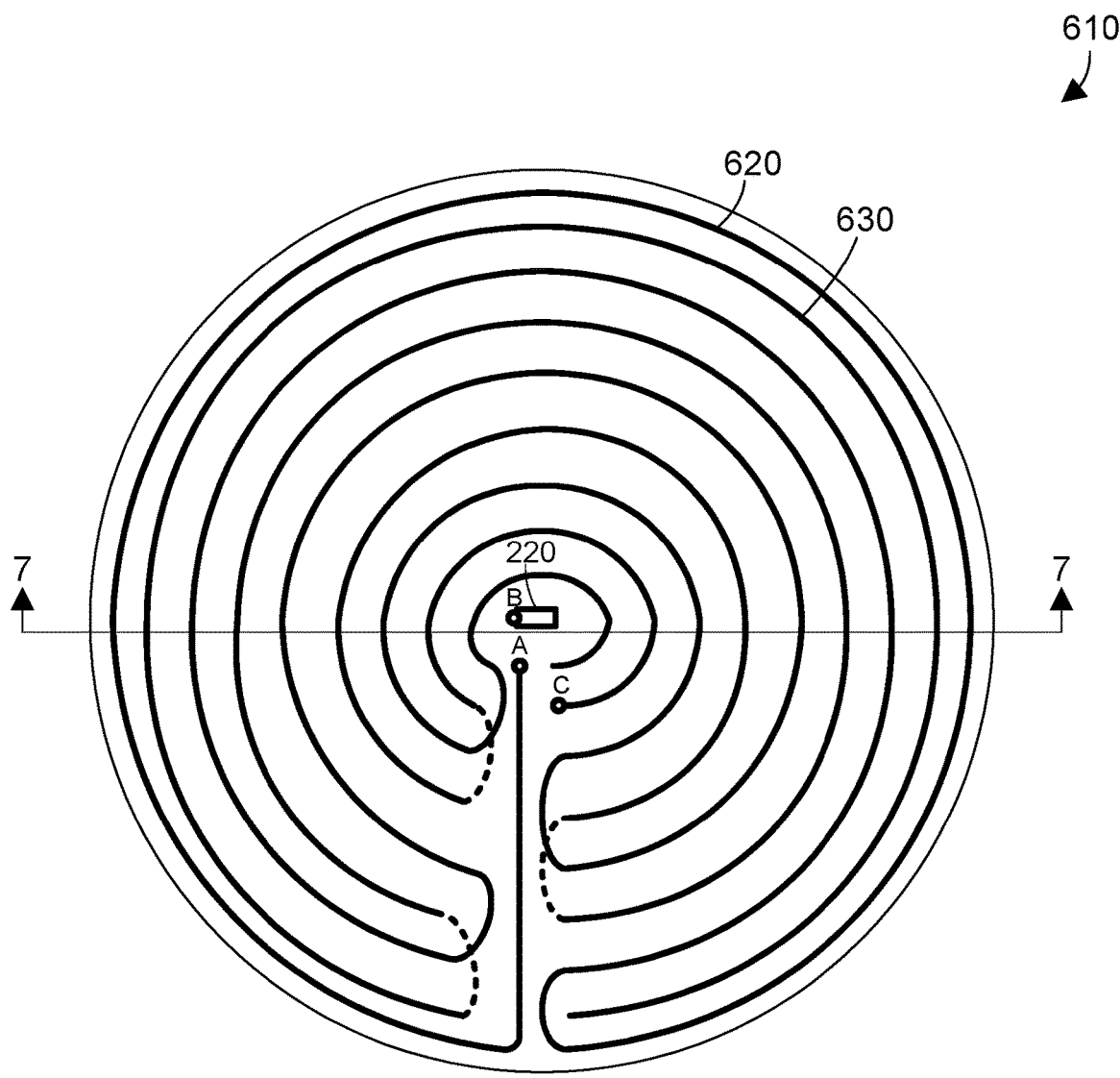
FIG. 6 is a bottom view of a second embodiment for the tabletop shown in FIG. 1 showing two heating elements embedded within the concrete mix of the tabletop.
Figure 7:
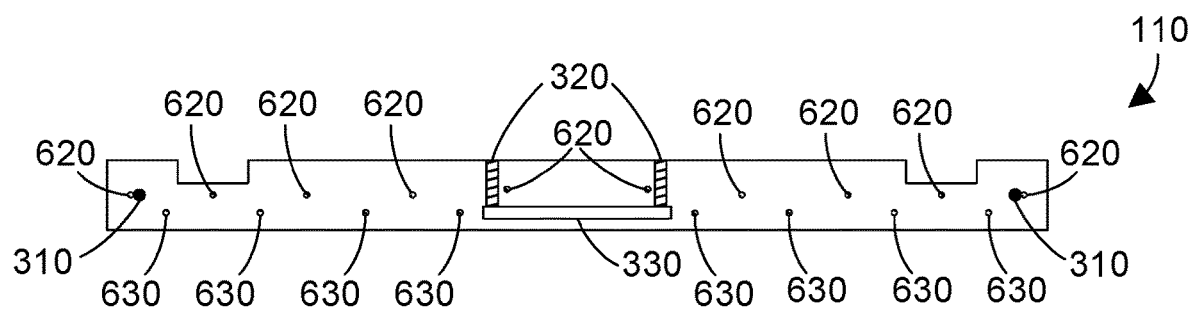
FIG. 7 is a cross-sectional view of the tabletop in FIG. 6 taken along the line 7-7.

Radiant furniture as disclosed herein can include multiple heating elements. The multiple heating elements can be turned on and off at the same time. In the alternative, the multiple heating elements can be turned on and off independently. Referring to FIG. 6, a tabletop 610 represents a second embodiment for the tabletop 110 shown in FIG. 1. The tabletop 610 includes two separate elements, a first 620 with electrical connections that exit the tabletop 610 at point A, and a second 630 with electrical connections that exit the tabletop at point C. Note these two separate elements 620 and 630 are interleaved with each other. The second heating element 630 has portions that are shown in dotted lines where it crosses the first heating element 620 to make it clear which runs are connected together. The two heating elements 620 and 630 can cross without touching when the heating elements are placed at different levels in the tabletop, as shown in FIG. 7. The first heating element 620 is placed at an upper position shown in FIG. 7 while the second heating element 630 is placed at a lower position in FIG. 7, thereby allowing them to cross without touching. Providing two heating elements that can be independently turned on or off by the controller allows greater versatility in how the tabletop 610 is used. For example, during weather that is slightly cool, turning on only the first heating element might provide the desired level of heating. For much colder weather, such as outside tables used at ski resorts, turning on both heating elements might be required to achieve the desired temperature.

Figure 8:
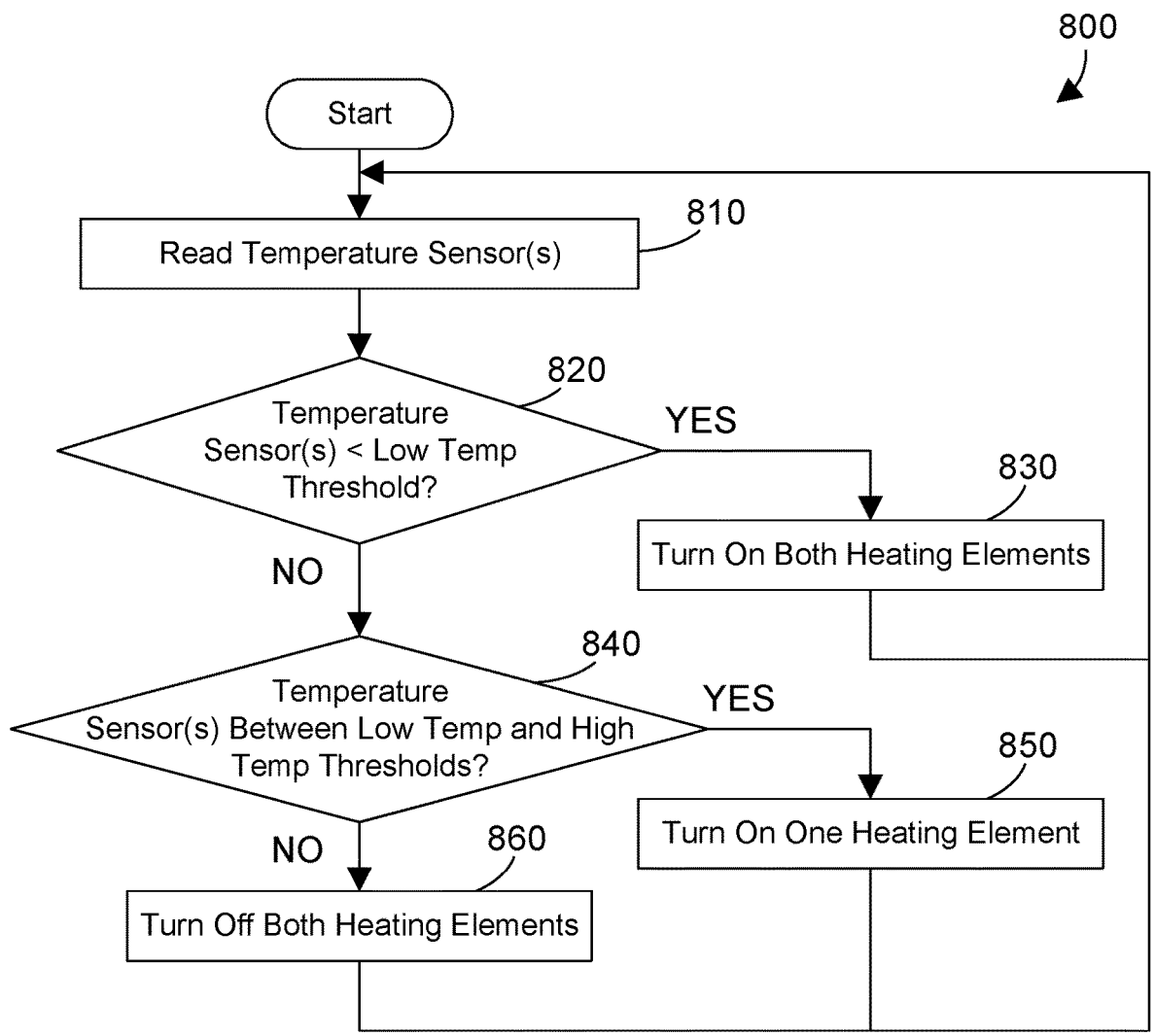
FIG. 8 is a flow diagram of a method for a controller to control radiant furniture that includes two heating elements, such as the tabletop shown in FIGS. 6-7.

Multiple heating elements can have different threshold temperatures that allow them to be independently controlled by the controller. Referring to FIG. 8, method 800 represents functions of the controller 450 shown in FIG. 4 when driving two heating elements independently. The temperature sensor(s) are read (step 810). The temperature sensors read in step 810 are the temperature sensor(s) 430 that sense the temperature of the heated surface(s) 410. When the temperature sensor senses a temperature of the heated surface(s) 410 lower than a low temperature threshold (step 820=YES), both heating elements are turned on (step 830). When the temperature sensor(s) sense a temperature of the heated surface(s) 410 that is not less than the low temperature threshold (step 820=NO), but sense a temperature that is between the low temperature threshold and a high temperature threshold (step 840=YES), only one of the two heating elements is turned on (step 850), while the other is turned off. When the temperature sensor senses a temperature of the heated surface(s) 410 that is not less than the low temperature threshold (step 820=NO) and that is not between the lower temperature threshold and the high temperature threshold (step 840=YES), this means the temperature of the heated surface(s) 410 is at or above the high temperature threshold, so both heating elements are turned off (step 860). A simple example will illustrate. Let's assume a radiant table is used as an outside table for a ski resort, where the ambient temperature can be very cold. Let's further assume a high temperature threshold of 100 degrees Fahrenheit (38 degrees Celsius), which is the desired temperature for the tabletop. A low temperature threshold of 80 degrees Fahrenheit (27 degrees Celsius) could be specified, so that when the table is first warming up after being turned on, both heating elements are turned on to bring the tabletop to 80 degrees Fahrenheit (27 degrees Celsius) as quickly as possible. Once the tabletop reaches 80 degrees Fahrenheit (27 degrees Celsius), one of the two heating elements would be turned off, with the remaining heating element remaining turned on until the tabletop reaches the 100 degrees Fahrenheit (38 degrees Celsius) desired operating temperature (upper temperature threshold). Note that on very cold days, the one heating element may be insufficient to warm the tabletop from the 80 degrees Fahrenheit (27 degrees Celsius) low temperature threshold to the 100 degrees Fahrenheit (38 degrees Celsius) upper temperature threshold. The controller logic 470 in the controller 450 could include programming or logic that could measure temperature rise of the radiant furniture over time. Thus, if the tabletop achieves a temperature of 80 degrees Fahrenheit (27 degrees Celsius) in 30 minutes, but after another 30 minutes the temperature of the tabletop using only one heating element is only 85 degrees Fahrenheit (29 degrees Celsius), the controller can recognize the one heating element is insufficient to achieve the 100 degrees Fahrenheit (38 degrees Celsius) upper temperature threshold, and can then turn on both heating elements until the 100 degrees Fahrenheit (38 degrees Celsius) upper temperature threshold is reached. Because the controller 450 also has access to one or more ambient temperature sensors 440, the controller can alter its function according to ambient temperature. For example, the controller 450 could be programmed to turn on a single heating element between the low temperature threshold and upper temperature threshold when the ambient temperature is above 55 degrees Fahrenheit (13 degrees Celsius), but to turn on two heating elements when the ambient temperature is less than 55 degrees Fahrenheit (13 degrees Celsius). Of course, any suitable number of heating elements, temperature sensors, and ambient temperature sensors could be used. For example, four different heating elements could be used in a single heated surface, with the controller independently driving the four heating elements according to defined temperature thresholds. A heated surface 410 could include multiple temperature sensors 430, where the controller takes readings from the multiple temperature sensors 430 and computes an average temperature reading. In another variation, one controller 450 could control different heated surfaces that each has one or more heating elements. For example, a picnic table could have a heated tabletop and heated bench seats, and controller 450 could independently control the heating elements in both benches to achieve a desired heat level for the benches, while independently controlling the heating element in the tabletop to a different temperature threshold. In addition, multiple controllers could be used to control different heated surfaces. Thus, for the example above, with a picnic table with a heated tabletop and two heated bench seats, three different controllers could be used, one for the tabletop and two for the two heated bench seats. The disclosure and claims herein expressly extend to any suitable number of controllers, heating elements and temperature sensors in radiant furniture.

Figure 9:
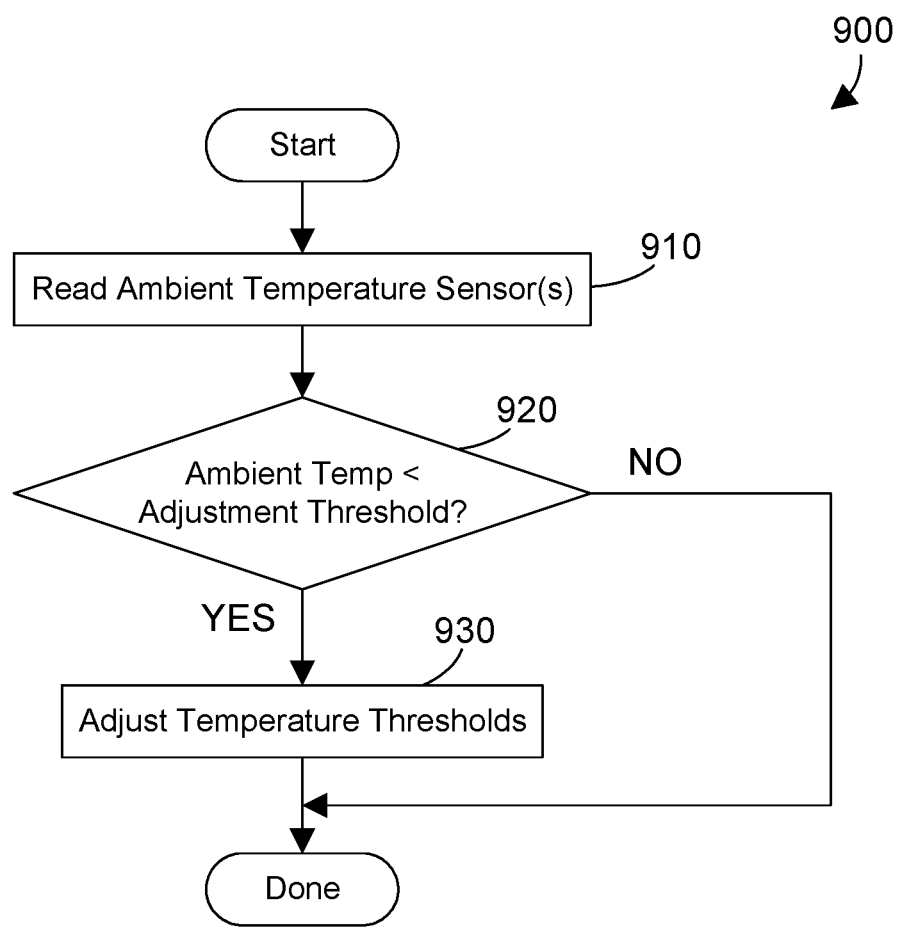
FIG. 9 is a flow diagram of a method for adjusting temperature thresholds when ambient temperature is below a specified adjustment threshold.

Because the controller 450 in FIG. 4 can measure the temperature of ambient air using one or more ambient temperature sensors 440, the controller 450 can take the ambient air temperature into account when controlling the heating elements in the heated surfaces. Referring to FIG. 9, method 900 shows one suitable adjustment the controller could make based on ambient temperature. We assume an adjustment threshold is defined in the controller. The ambient temperature sensor(s) are read (step 910). When the ambient temperature is less than the ambient threshold (step 920=YES), the temperature thresholds in the controller are adjusted (step 930). When the ambient temperature is not less than the ambient threshold (step 920=NO), method 900 is done. Method 900 thus illustrates a very simply way for the controller to take ambient air temperature into account, and to vary the temperature thresholds according to ambient air temperature. Thus, using the example of an outside table at a ski resort, the controller could adjust the temperature thresholds when the weather gets very cold to provide more heat to the heated tabletop.

Figure 10:
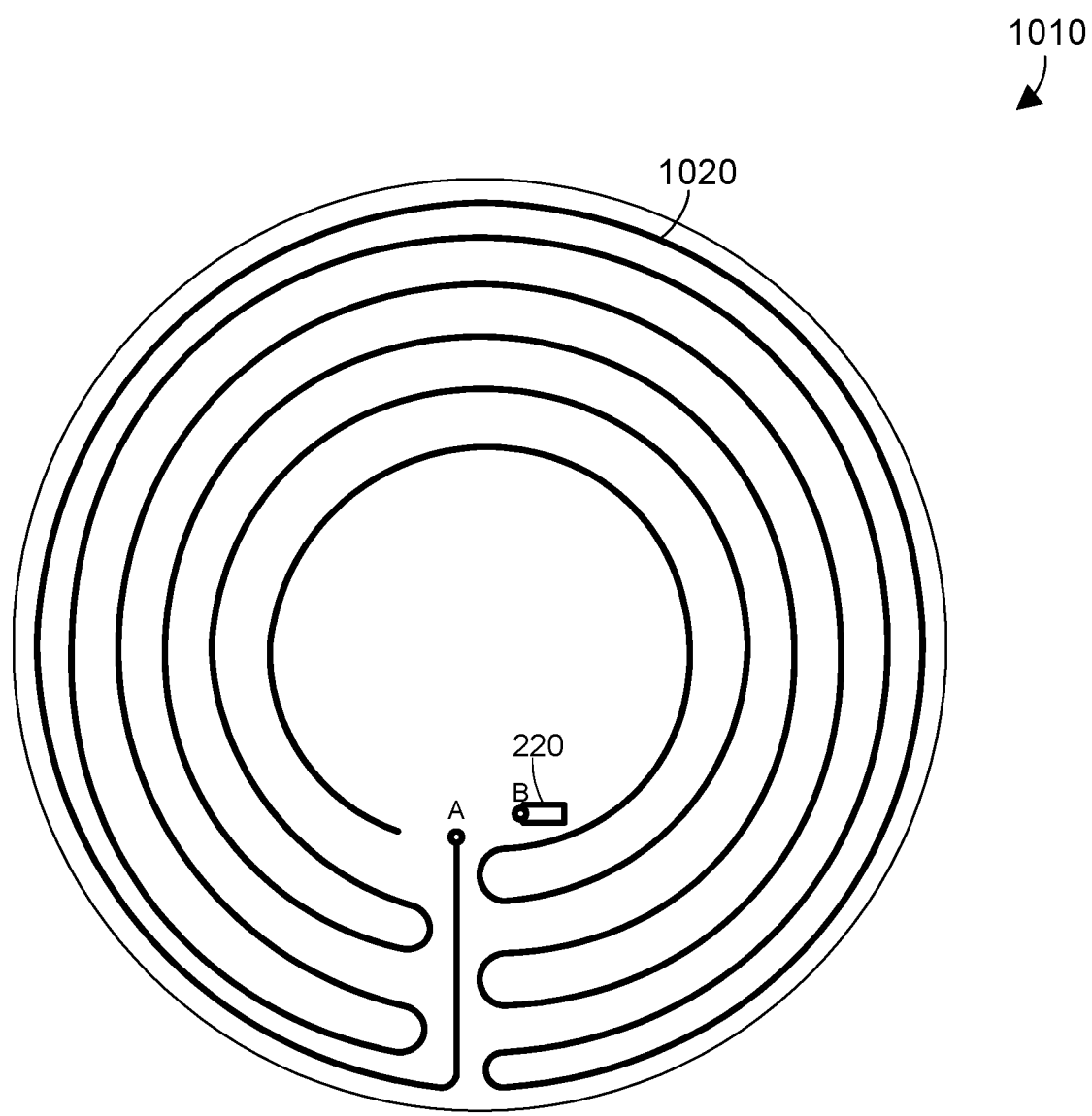
FIG. 10 is a bottom view of a third embodiment for the tabletop shown in FIG. 1 showing a heating element embedded within the concrete mix of the tabletop with the center of the tabletop not having any heating element.

It is also within the scope of the disclosure and claims herein to provide a heated surface where only part of the surface is heated. Referring to FIG. 10, a tabletop 1010 represents an alternative suitable implementation for the tabletop 110 shown in FIG. 1. In this implementation, the heating element 1020 does not extend to the center of the tabletop 1010. This allows the center of the tabletop 1010 to be cooler than the outside portion that has the heating element 1020. Point A is an exit point for electrical connections to the heating element 1020, and point B is an exit point for electrical connections to the temperature sensor 220. Note the temperature sensor 220 has been moved from the center of the table to a position closer to the heating element 1020, since the center of the table does not include any heating element. Thus, a person dining at an outside table on a cool evening could enjoy the heat of the tabletop 1020 while placing their iced beverage towards the center of the tabletop 1010 so the heat will not warm their drink and melt the ice in the beverage to the same extent as would happen if the person were to place the drink on the part of the table that includes the heating element 1020.

While electrical heating elements are discussed above, radiant furniture could instead be made using hot water supplied hydronic tubing, where hot water is pumped through heating tubes (water pipes) embedded in the concrete mix of the table. Thus, heating element 210 in FIGS. 2 and 3, heating elements 620 and 630 in FIGS. 6 and 7, and heating element 1020 in FIG. 10 could all be replaced by suitable heating tubes that carry hot water. Note that when using heating tubes, it will be required to make a connection to both ends of the heating tube so the hot water can flow from one end to the other. Suitable heating tubes include any type of known pipe, including metal pipe such as copper tubing, polyvinyl chloride (PVC) pipe, PEX tubing, rubber tubing such as Delta-Tube SD available from Delta T Solutions in San Marcos, Calif., etc. Any suitable heating tube that is capable of carrying hot water can be used.

Figure 11:
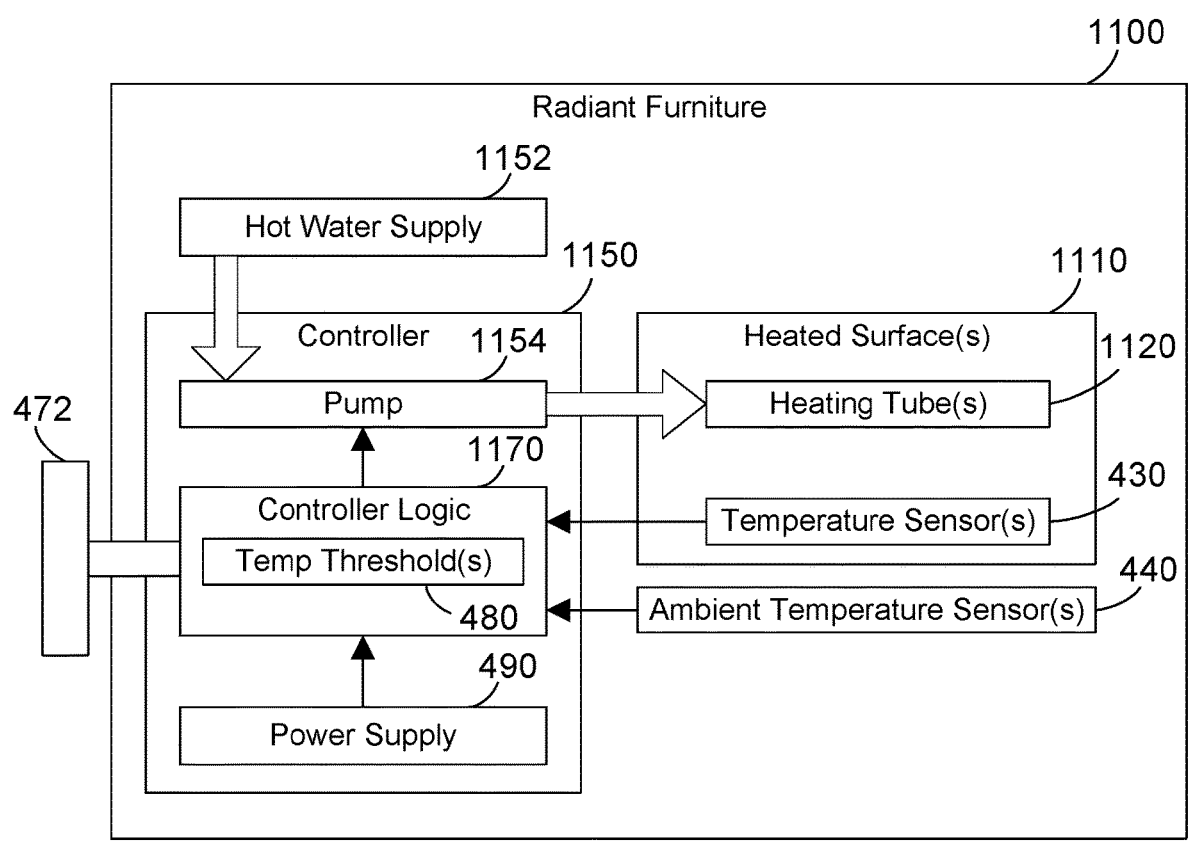
FIG. 11 is a block diagram of radiant furniture that uses heating tubes through which hot water is circulated.

FIG. 11 shows another example of radiant furniture 1100 that is heated with hot water. The heated surface(s) 1110 include one or more heating tube(s) 1120. The temperature sensor(s) 420 and ambient temperature sensor(s) 440 could be the same as used in the radiant furniture 400 shown in FIG. 4. The controller 1170 uses the temperature threshold(s) 480 to activate a pump 1154 that pumps hot water from a hot water supply 1152 through the heating tubes 1120. The hot water supply can be any suitable hot water supply, including a water heater with a tank, a tankless water heater, a natural hot spring, or any other suitable source of hot water. The power supply 490 and adjustment mechanism 472 could be the same as used for the electric configuration shown in FIG. 4.

The hot water supply 1152 in FIG. 11 could also be replaced or supplemented with a cold water supply to cool the radiant furniture, when needed. Thus, in very hot climates, cold water could be circulated from a cold water supply by the pump 1154 through the heating tubes 1120 to cool the heated surface(s) 1110.

Figure 12:
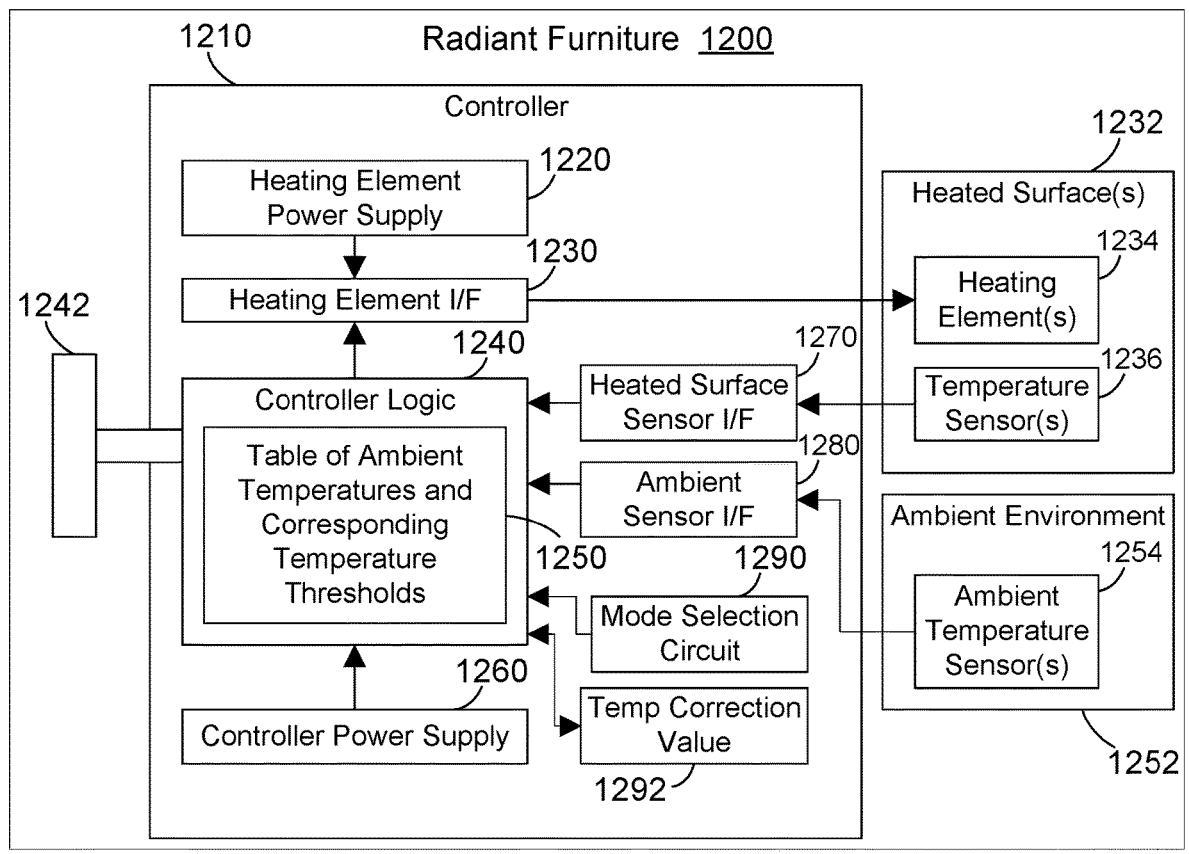
FIG. 12 is a block diagram of a second suitable embodiment of radiant furniture that includes a controller that controls temperature of one or more heated surfaces in the radiant furniture.

FIG. 12 shows another embodiment for radiant furniture 1200 within the scope of the disclosure and claims herein. Heated furniture 1200 comprises a controller 1210 coupled to one or more heated surfaces 1232 and one or more ambient temperature sensors 1254 in an ambient environment 1252. A heating element power supply 1220 is a suitable power supply for powering one or more heating elements 1234 in one or more heated surfaces 1232. In one suitable implementation, the heating element power supply 1220 is an alternating current (AC) power supply, such as a 120 VAC or 240 VAC supply from a wall receptacle. A heating element interface 1230 receives a control signal asserted by controller logic 1240, and in response, connects the heating element power supply 1220 to the heating element(s) 1234. When the control signal from the control logic 1240 to the heating element interface 1230 is not asserted, the heating element interface 1230 does not connect the heating element power supply 1220 to the heating element(s) 1234. The heating element interface can be any suitable electrically-controlled switch, including without limitation a relay, a power transistor, etc.

The controller 1210 includes a heated surface sensor interface 1270 that receives input from one or more temperature sensor(s) 1236 in the heated surface(s) 1232 and provides that input to the controller logic 1240. One suitable example for temperature sensor(s) 1236 are thermistors that change resistance as their temperature changes. Another suitable example for temperature sensor(s) 1236 are digital temperature sensors that report temperature in a digital form. Of course, other suitable implementations for the temperature sensor(s) 1236 are within the scope of the disclosure and claims herein. In one suitable embodiment, the heated surface interface 1270 can pass a signal from the temperature sensor(s) 1236 directly to the controller logic 1240. In a different suitable embodiment, the heated sensor interface 1270 can convert the signal from the temperature sensor(s) 1236 into a different form that can be read by the controller logic 1240. For example, the heated surface sensor interface 1270 could convert a voltage value across a thermistor-type temperature sensor into a digital value that represents to the controller logic 1240 the temperature of the temperature sensor.

The ambient sensor interface 1280 receives input from one or more ambient temperature sensors 1254 in an ambient environment 1252. The ambient environment 1252 can be air or could be a solid surface that is separate from the heated surface(s) 1232. As discussed above with respect to temperature sensor 1236, the ambient temperature sensor 1254 could be a thermistor, a digital temperature sensor that reports temperature in a digital form, or any other suitable temperature sensor that can report temperature to the controller 1210. In one specific embodiment, the ambient temperature sensor 1254 is a thermistor that extends to an exterior of an enclosure for the controller 1210 so it can measure the temperature of the air away from the heated surface(s) 1232 and outside of the enclosure for the controller 1210. In another specific embodiment, the ambient temperature sensor could be attached to a surface that is not part of the heated surface, such as a table leg. The ambient environment 1252 can be any suitable environment that provides a temperature reading from the ambient temperature sensor(s) 1254 that informs the controller 1210 of the ambient temperature of the ambient environment 1252, which is separate from the heated surface(s) 1232. The ambient sensor interface 1280, like the heated surface sensor interface 1270 discussed above, can provide the signals from the ambient temperature sensor(s) 1254 directly to the controller logic 1240, or could convert the signals from the ambient temperature sensors 1254 to any suitable form that can be read by the controller logic 1240.

Controller logic 1240 is coupled to a controller power supply 1260, which can be any suitable power supply, including without limitation an alternating current (AC) power supply, a direct current (DC) power supply, batteries, a solar panel, etc. Controller 1210 also includes a mode selection circuit 1290 that tells the controller logic 1240 the mode selection when the controller logic 1240 powers on. The mode selection circuit 1290 can be any suitable way to represent different modes to the controller logic 1240. Specific examples include dual inline package (DIP) switches and connector pins that receive jumpers. Of course, other implementations of a mode selection circuit are possible, including a resistive knob, a digital knob, a keypad, etc. The mode selection circuit 1290 expressly extends to any suitable circuit that is capable of communicating the selection of different modes to the controller logic 1240, including one or more operating modes and a calibration mode, as discussed in more detail below.

Controller logic 1240 receives input from a knob 1242 that is preferably mounted to an enclosure for the controller 1210 such that the knob 1242 is external to the enclosure and can be turned by a person using his or her fingers. The knob 1242 can include any suitable circuitry for communicating different positions of the knob, including a resistive potentiometer and a digital knob that provides a different digital value for each of a plurality of positions of the knob. The controller logic 1240 receives input from the knob 1242, and performs different functions depending on the knob position, as explained in more detail below.

Figure 13:
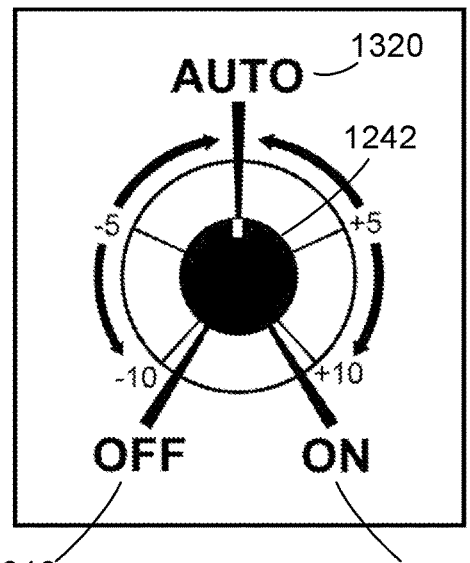
FIG. 13 shows a knob that can be used to vary the function of the controller logic 1240 shown in FIG. 12.

One suitable implementation for the knob 1242 in FIG. 12 is shown in FIG. 13. Knob 1242 is a resistive potentiometer in a voltage divider circuit that provides a voltage that is proportional to the knob position. The knob includes a white mark that indicates the position selected by the knob, as shown pointing to the AUTO position 1320 in FIG. 13. The knob 1242 preferably includes a detente center position corresponding to AUTO 1320 in FIG. 13, and can be turned counter-clockwise until the knob 1242 reaches the OFF position 1310 and can be turned clockwise until the knob 1242 reaches the ON position 1330. The function of the controller logic 1240 depends on the mode selection circuit 1290 and the position of the knob 1242, as discussed in detail below.

The controller logic 1240 can include any suitable hardware or combination of hardware and software that provides the functions disclosed herein. One suitable implementation for controller logic 1240 is a microcontroller that includes programming to perform the functions disclosed herein. Other implementations are also possible, including a microprocessor, a state machine, etc.

The controller logic 1240 in FIG. 12 preferably includes a table of ambient temperatures and corresponding temperature thresholds 1250. One suitable implementation for the table of ambient temperatures and corresponding temperature thresholds 1250 is shown in table 1400 in FIG. 14. All temperatures in FIG. 14 are in degrees Fahrenheit, followed by degrees Celsius in parentheses. The table 1400 includes temperature thresholds for a table, for a seating panel with no pad, and for a seating panel with a pad. When the knob is in the ON position, the corresponding default temperatures for a table, seating panel with no pad, and seating panel with pad are 105 degrees Fahrenheit (41 degrees Celsius), 100 degrees Fahrenheit (38 degrees Celsius), and 110 degrees Fahrenheit (43 degrees Celsius), respectively. When the knob is in the OFF position, the controller logic does not power the heating elements. When the knob is between the ON and OFF positions, the temperature threshold used by the controller depends on the type of heated surface as specified by the mode selection circuit 1290 in FIG. 12 and the ambient temperature. A few simple examples will illustrate. If the mode selection circuit 1290 is set to "Table", and if the ambient temperature is 66 degrees Fahrenheit (19 degrees Celsius), the corresponding temperature threshold is 102 degrees Fahrenheit (39 degrees Celsius). If the mode selection circuit is set to "Seating/No Pad", and the ambient temperature is 78 degrees Fahrenheit (26 degrees Celsius), the corresponding temperature threshold is 81 degrees Fahrenheit (21 degrees Celsius). If the mode selection circuit is set to "Seating/With Pad", and the ambient temperature is 60 degrees Fahrenheit (16 degrees Celsius), the corresponding temperature threshold is 106 degrees Fahrenheit (41 degrees Celsius). The goal of the radiant furniture is to provide a level of heating that is comfortable for people. The amount of heating needed varies depending on the ambient temperature and the type of furniture, as shown in the table 1400 in FIG. 14. In general, as the ambient temperature decreases, the temperature threshold increases, and as the ambient temperature increases, the temperature threshold decreases. The ability to dynamically change the temperature threshold according to ambient temperature is a significant advantage not known in the art.

Figure 15:
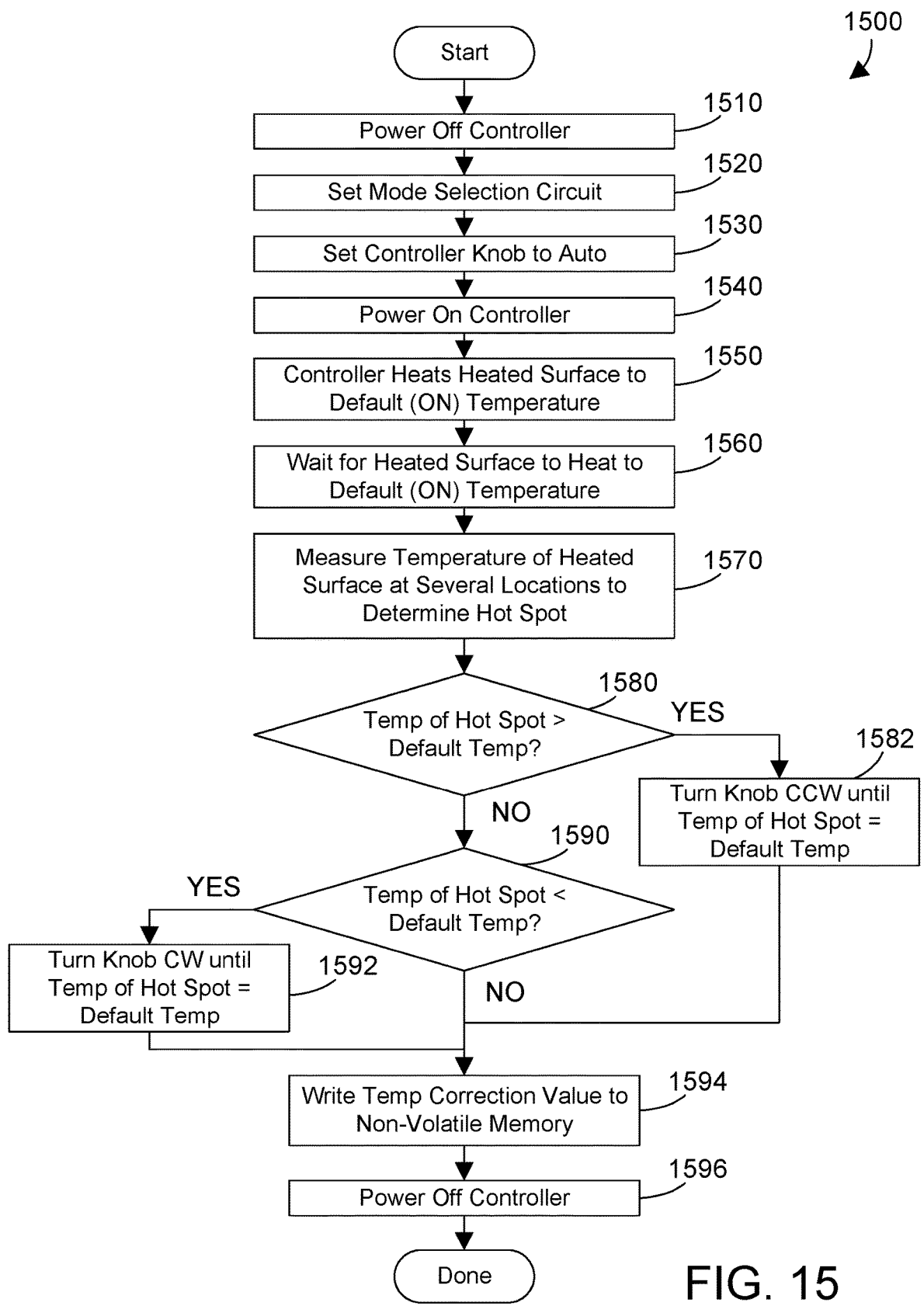
FIG. 15 is a flow diagram of a method for calibrating the controller logic 1240 in FIG. 12 to heat a heated surface in radiant furniture.

The controller 1210 also includes a temperature correction value 1292 that is determined during a calibration of the controller 1210. Referring to FIG. 15, a method 1500 represents steps performed to calibrate the controller 1210 in FIG. 12. The controller is powered off (step 1510). The mode selection circuit is set to calibrate and is also set to select the type of heated surface being controlled by the controller (step 1520). The controller knob is set to the center AUTO position 1320 shown in FIG. 13 (step 1530). The controller is then powered on (step 1540). The controller heats the heated surface to the Default (ON) temperature for the selected heated surface type (step 1550). Some time is allowed to pass for the heated surface to heat to the default (ON) temperature (step 1560). The temperature of the heated surface is them measured at several locations to determine a hot spot (step 1570). The measurement of the hot spot in step 1570 can be done using any suitable temperature measurement apparatus. The preferred instrument for measuring the hot spot in step 1570 is a heat camera, which visually identifies hot spots using colors. Of course, other instruments could also be used, such as a hand-held pyrometer, such as laser temperature gauges that are readily available. Such instruments are generally referred to herein as temperature measurement instruments that are external to the controller. When the temperature of the hot spot is greater than the default temperature (step 1580=YES), the knob 1242 in FIG. 13 is turned counter-clockwise (CCW) until the temperature of the hot spot equals the default temperature (step 1582). Note some time will need to pass in step 1582 to see the changed temperature equalize in the heated surface. Let's assume for an example that the hotspot is five degrees Fahrenheit (3 degrees Celsius) above the default temperature. The knob 1242 in FIG. 13 is turned CCW to the −5 setting, and some time passes to let the changed temperature setting take effect. Assuming the temperature of the hot spot settles to the default temperature with the knob in the −5 degree setting, the temperature correction value of −5 degrees Fahrenheit (−3 degrees Celsius) is written to the temperature correction value 1292 in a non-volatile memory in the controller 1210 (step 1594). The controller is then powered off (step 1596). The controller is then ready to heat the heated surface in the radiant furniture.

When the temperature of the hot spot is not greater than the default temperature (step 1580=NO), and when the temperature of the hot spot is not less than the default temperature (step 1590=NO), this means the hot spot is at the default temperature. In this case, the temperature correction value of zero is written to the non-volatile memory (step 1594), and the controller is powered off (step 1596). The controller is then ready to heat the heated surface.

When the temperature of the hot spot is not greater than the default temperature (step 1580=NO) but the temperature of the hot spot is less than the default temperature (step 1590=YES), the knob is turned clockwise (CW) until the temperature of the hot spot is equal to the default temperature (step 1592). The temperature correction value is then written to the non-volatile memory (step 1594), the controller is powered off (step 1596). The controller is then ready to heat the heated surface.

Note there may be some fine tuning in steps 1582 and 1592 in FIG. 15. For example, if the knob is turned in step 1582 or step 1592 and the hot spot does not equal the default temperature, the knob may be turned again, and this process is repeated until the temperature of the hot spot is equal to the default temperature.

The calibration mode is useful due to variations in manufacturing processes and materials, and due to different configurations of heated surfaces. The calibration mode allows adjusting the controller to control a number of different configurations and types of radiant furniture.

Figure 16:
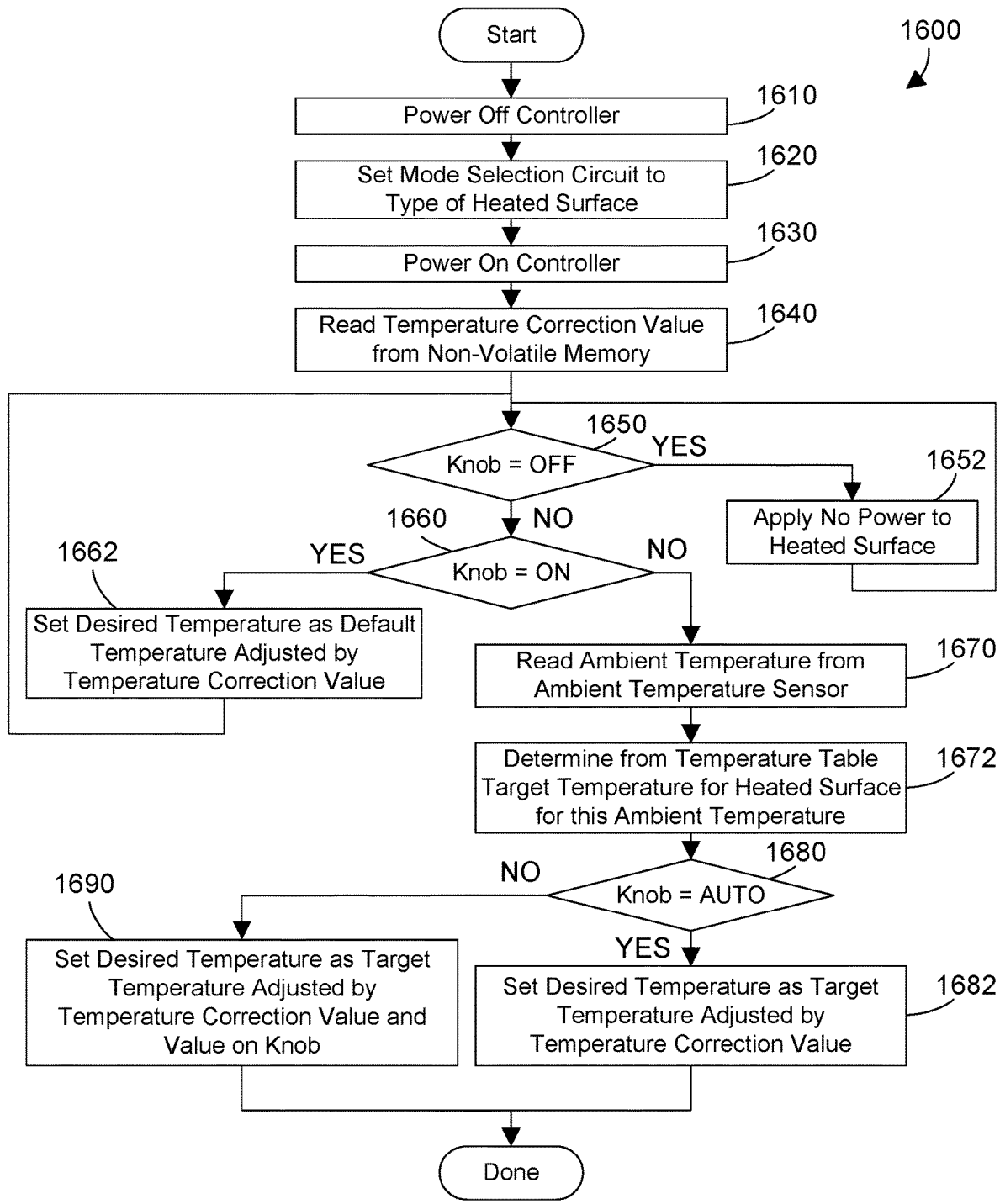
FIG. 16 is a flow diagram of a method for heating a heated surface in radiant furniture.

Once the controller has been calibrated and the temperature correction value has been written to the non-volatile memory in the controller, the controller is ready to heat radiant furniture that includes a heated surface. Referring to FIG. 16, a method 1600 begins by powering off the controller (step 1610). The mode selection circuit is set to the type of heated surface (step 1620). The type of heated surface was previously selected during the calibration mode represented in FIG. 15, so the mode selection circuit could be changed simply to remove the calibration setting while maintaining the type of heated surface setting. A simple example will illustrate. Let's assume the mode selection includes a connector header with four sets of two parallel pins, with each of the first three sets of parallel pins setting the type of heated surface while the fourth set of parallel pins is used for calibration mode. In this example, one jumper is placed on one of the three sets of parallel pins to select the type of heated surface, and another jumper is placed on the fourth set of parallel pins to select calibration mode. In this example, setting the mode selection circuit to the type of heated surface in step 1620 immediately following calibration would mean simply removing the calibration jumper and leaving the jumper for the type of heating surface in place.

Once the mode selection circuit is set to the type of heated surface in step 1620, the controller is powered on (step 1630). On power on, the controller reads the mode selection circuit to determine the type of radiant furniture being heated. The temperature correction value is also read from non-volatile memory (step 1640). When the knob is in the OFF position 1310 in FIG. 13 (step 1650=YES), the controller does not apply any power to the heated surface (step 1652). When the knob is not in the OFF position 1310 (step 1650=NO), but the knob is in the ON position 1330 in FIG. 13 (step 1660=YES), the desired temperature is set to the default temperature adjusted by the temperature correction value (step 1662). A default temperature setting is needed, especially when the heated furniture is being displayed for sale in a furniture showroom. When the ambient temperature is 74 degrees Fahrenheit (23 degrees Celsius), for example, the target temperature threshold in table 1400 for a table is 94 degrees Fahrenheit (34 degrees Celsius). This 20 degree Fahrenheit (11 degrees Celsius) differential from 74 degree Fahrenheit (23 degrees Celsius) ambient to 94 degree Fahrenheit (34 degrees Celsius) table is not nearly as noticeable to a person who puts his or her hand on a heated tabletop as the 31 degree Fahrenheit (18 degrees Celsius) differential from 74 degree Fahrenheit (23 degrees Celsius) ambient to 105 degree Fahrenheit (41 degrees Celsius) default temperature. The ON position for 1330 can thus be used as a "demo mode" for the radiant furniture, setting the target temperature threshold higher than normal to allow a person to more easily feel the warmth coming from the radiant furniture.

When the knob is between the OFF position 1310 and ON position 1330 (step 1650=NO and 1660=NO), this is the normal operating mode for the controller to heat the radiant furniture. The ambient temperature is read from the ambient temperature sensor (step 1670). The target temperature for the heated surface for this ambient temperature is determined from the temperature table (step 1672). When the knob is in the AUTO position 1320 in FIG. 13 (step 1680=YES), the desired temperature is set to the target temperature adjusted by the temperature correction value (step 1682). When the knob is not in the AUTO position 1320 (step 1680=NO), the desired temperature is set to the target temperature adjusted by the temperature correction value and the value on the knob (step 1690). Method 1600 is then done.

A few simple examples will illustrate. We assume for these examples the calibration in FIG. 15 has already been performed, and a temperature correction value of −3 degrees Fahrenheit (−2 degrees Celsius) has been stored in the non-volatile memory of the controller in step 1594 in FIG. 15. We further assume the heated surface is a table. When the knob is in the ON position 1310 in FIG. 13 (step 1660=YES), the desired temperature is set to the default temperature, which from the table 1400 is 105 degrees Fahrenheit (41 degrees Celsius) when the heated surface is a table, adjusted by the temperature correction value of −3 degrees Fahrenheit (−2 degrees Celsius), which means the desired temperature is set to 102 degrees Fahrenheit (39 degrees Celsius). We now assume the knob is in the +5 degree position shown in FIG. 13. The knob is not in the OFF position (step 1650=NO) and is not in the ON position (step 1660=NO), so the ambient temperature is read from the ambient temperature sensor (step 1670). We assume the ambient temperature read in step 1670 is 65 degrees Fahrenheit (18 degrees Celsius). Method 1600 then consults the temperature table and determines the target temperature for a table at 65 degrees Fahrenheit (18 degrees Celsius) is 103 degrees Fahrenheit (39 degrees Celsius), as shown in FIG. 14. The knob is not in the AUTO position (step 1680=NO) because the knob is set to +5 degrees. The desired temperature is then set as the target temperature of adjusted by the temperature correction value and the value on the knob, meaning the desired temperature is set to 103+(−3)+5=105 degrees Fahrenheit (41 degrees Celsius). Method 1600 illustrates how the desired temperature can be adjusted for both the temperature correction value determined during calibration of a heated surface and the value on the knob. Note the "desired temperature" in the discussion above with respect to FIG. 16 is a temperature threshold in the controller, below which the controller turns on the heating element(s) in the heated surface and above which the controller turns off the heating element(s) in the heated surface, as shown in FIG. 5 and discussed above.

The knob on the controller gives a user the option of increasing or decreasing the temperature of the table to suit the user's preference. If the user likes more heat than the radiant furniture provides with the knob in the AUTO position, the user can turn the knob clockwise to increase the temperature from one to 10 degrees Fahrenheit (one to 6 degrees Celsius). If the user likes less heat than the radiant furniture provides with the knob in the AUTO position, the user can turn the knob counter-clockwise to reduce the temperature from one to 10 degrees Fahrenheit (one to 6 degrees Celsius). The knob thus gives the user the capability of adjusting the level of heat in radiant furniture to the user's liking.

FIG. 10 shows one suitable embodiment for a round heated table that includes heating in the outer portion of the table and does not include any heating on an inner portion of the table, as shown by the runs of the heating element in FIG. 10. Providing an inner portion of the table that is not heated creates an inner area where a person sitting at the table can place drinks or other things the person does not want on the heated surface. Tests by applicant have shown the temperature differential between the heated portion of the table and the unheated portion of the table such as the one in FIG. 10 can be considerable. The greater the difference in temperature between the inner, unheated portion and the outer, heated portion, the greater the thermal stress in the concrete tabletop. This thermal stress can create cracks in the table for a normal concrete mix. To avoid cracking in the tabletop due to thermal stress, an improved concrete mix can be used. One suitable concrete mix that can withstand significant thermal stress without cracking is ElastoCrete manufactured by ElastoCrete LLC in St. George, Utah. Other ingredients could also be added to concrete to reduce the likelihood of cracking due to thermal stress. For example, siloxane in various forms could be used to increase the flexibility and reduce the rigidity of the concrete, making the concrete less likely to crack. The disclosure and claims herein expressly extend to using any suitable concrete mix, including those that include ingredients that make the concrete mix more flexible and less likely to crack.

A first suitable concrete mix for a concrete substrate for a heated surface in radiant furniture that uses ElastoCrete is:
    50 lb (23 kg) ElastoCrete Kit (includes jugs of liquid and bags of powder that are mixed together) calcium carbonate powder/granules The size of the calcium carbonate powder/granules is preferably in the range of 0.001 inch (0.03 mm) to 0.25 inch (6.4 mm), is more preferably in the range of 0.002 inch (0.05 mm) to 0.0625 inch (1.6 mm), and is most preferably in the range of 0.003 inch (0.08 mm) to 0.016 inch (0.41 mm). Of course, a mixture of different particle sizes can be used. For example, a product called Marble Pro from ACS International is one suitable example of calcium carbonate powder that could be used in the mix above. The specifications for Marble Pro state <1% for 40 mesh (0.016 inch or 0.41 mm) retained, and 50-65% for 200 mesh (0.003 inch or 0.08 mm) retained. The calcium carbonate powder is preferably in the range from 20-54 lb (9 to 24 kg), more preferably is in the range of 23-45 lb (10-20 kg), and most preferably in the range of 25-38 lb (11 to 17 kg).

Adjustments to the weight of calcium carbonate can be made according to the size of the powder/granules used. Smaller sizes will typically absorb more liquid per weight, which means the smaller the size, the less amount of powder/granules that has to be used.

A second suitable concrete mix for a concrete substrate for a heated surface in radiant furniture that uses ElastoCrete is:
    50 lb (23 kg) ElastoCrete Kit (includes jugs of liquid and bags of powder that are mixed together)
    silica sand In the most preferred implementation, the silica sand includes granules that have different sizes over a wide range. The silica sand in the mix above has a granule size that is preferably smaller than 0.075 inch (1.9 mm), and is more preferably smaller than 0.05 inch (1.3 mm). The amount of silica sand in the mix above is preferably 0 to 18.5 lb (0 to 8.4 kg), is more preferably 5 to 12 lb (2.3 to 5.4 kg), and is most preferably 6.5 to 7.5 lb (2.9 to 3.4 kg).

Other admixtures can be added to the concrete mix. For example, dyes, powdered colorants, and fibers may be added within the scope of the disclosure and claims herein. A third suitable concrete mix for a concrete substrate for a heated surface in radiant furniture is:
    40% Proprietary mix (mixed 66% liquid to 34% powder by weight)
    45% calcium carbonate aggregates/powders
    15% silica sand
    0.2-2% dyes or colorants
    0.15-0.50% fibers The proprietary mix above could be ElastoCrete, or another siloxane-based concrete mix that includes a liquid polymer modified cement blend and a powder blend that activates with the liquid. The calcium carbonate can be any suitable particle size. The silica sand can be any suitable particle size. The dyes or colorants, when used, can be liquid or powder form. The fibers can be any fiber type that is suitable for providing strength in concrete, including without limitations glass fibers, polyvinyl alcohol (PVA) glass fibers, carbon fibers, and natural fibers, including plant-based fibers and animal-based fibers such as animal hair, etc. When dyes/colorants and/or fibers are used, the amount of calcium carbonate aggregates/powders or sand can be reduced to provide a desired percentage of dyes/colorants and/or fibers.

Using a concrete mix that includes ElastoCrete or siloxane increases flexibility and therefore reduces the likelihood of the concrete substrate cracking, this comes at a cost of the surface of the concrete substrate being more susceptible to scratches. One way to make the concrete substrate less susceptible to scratches is to coat the top of the concrete substrate with a suitable clear coat. One particular example of a suitable clear coat that is very durable is Hydrowix sold by ElastoCrete, LLC. Of course, any suitable clear coat could be used. Adding a ground glass powder to the clear coat increases the hardness, and therefore susceptibility to scratches, in the clear coat.

Standard concrete mixes have a flexural strength that is typically 10-13% of the compressive strength of the concrete. Thus, a concrete mix that has a compressive strength of 7,000 psi (492 kg per square cm) might have a flexural strength of 700 psi (49.2 kg per square cm). Increasing flexural strength in standard concrete mixes would typically require increasing the compressive strength. Yet improved mixes provide an increase in flexural strength that is much greater than what is possible using standard concrete mixes.

Flexural strength of a concrete mix relates to the likelihood a concrete substrate made with the mix will crack due to thermal stress. By adding ingredients to a concrete mix that increases its flexural strength, the likelihood of a heated surface cracking is reduced. This is a major benefit of using the ElastoCrete or siloxane in the concrete mix as disclosed herein. ElastoCrete has a flexural strength of 2,200 psi (155 kg per square cm) and has a compressive strength of 7,500 psi (527 kg per square cm). The flexural strength of ElastoCrete is thus in excess of 29% of its compressive strength, significantly higher than the 10-13% of standard concrete mixes.

Another suitable concrete mix for a heated surface is glass fiber reinforced concrete (GFRC). GFRC can have a flexural strength up to 3,000 psi (211 kg per square cm) with internal reinforcements, such as rebar or wire mesh. GFRC has the additional benefit of needing less thickness to achieve a desired flexural strength, thereby reducing the quantity of concrete mix needed and decreasing the thickness of the heated surface. One suitable GFRC mix for a concrete substrate for a heated surface in radiant furniture is:
  1 part Portland cement
  1 part sand
  Pozzolan at 10 to 25% cement replacement
  Acrylic polymer emulsion at 5% acrylic solids by weight of cement
  Chopped alkali-resistant (AR) glass fibers at 2-6% by weight
  Optional admixtures: superplasticizer, color (dry or liquid)

While the specific amounts and ranges above provide a suitable GFRC mix according to a first embodiment, the amounts could vary within the scope of the disclosure and claims herein. For example, the amounts specified above could vary by as much as 50% in a second embodiment, and more preferably could vary by 25% in a third embodiment. The disclosure and claims herein expressly extend to any suitable GFRC mix for a concrete substrate in a heated surface in radiant furniture.

Figure 17:
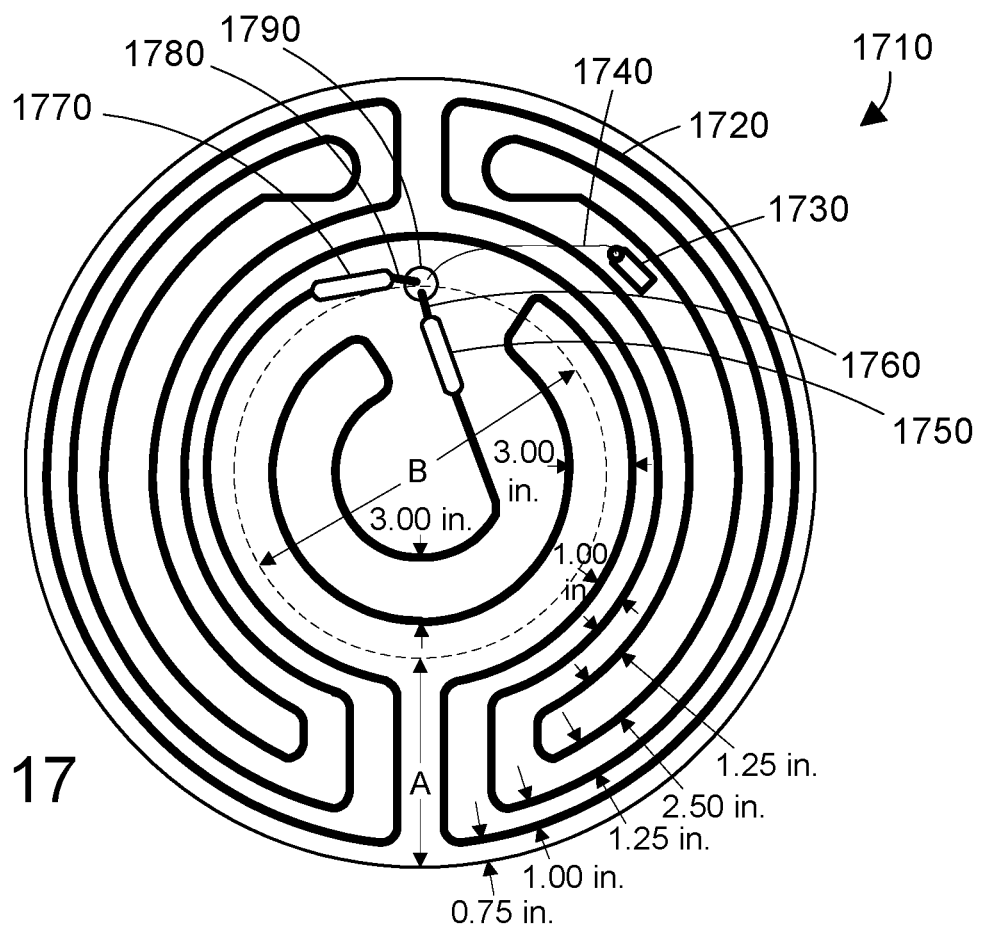
FIG. 17 shows one suitable configuration for heating element runs in a round tabletop.

Another way to reduce the likelihood of a tabletop cracking is to heat the interior portion to a lesser degree than the outer portion. Referring to FIG. 17, a round tabletop 1710 includes an outer ring portion A that has a much higher density of heating element runs than the inner circular portion B. Building tables with varying layouts of heating element runs has shown the configuration in FIG. 17 to provide even heat in the outer portion A while providing significantly less heat in the inner portion B, thereby reducing the thermal stress in the tabletop due to temperature differential between the inner portion B and the outer portion A. In the specific configuration shown in FIG. 17, the outer run of the heating element is 0.75 inches (1.9 cm) from the center of the heating element to the edge of the table. The second run is 1.00 inches (2.5 cm) from the center of the first run to the center of the second run. The third run is 1.25 inches (3.2 cm) from the center of the second run to the center of the third run. The fourth run is 2.50 inches (6.4 cm) from the center of the third run to the center of the fourth run. The fifth run is 1.25 inches (3.2 cm) from the center of the fourth run to the center of the fifth run. The sixth run is 1.00 inches (2.5 cm) from the center of the fifth run to the center of the sixth run. We thus see a pattern on the outer portion A, where the density of the heating element is greater at both the inside and outside edges of the outer portion A, while being less dense in the middle of outer portion A. Testing has shown the configuration of the heating element in FIG. 17 provides even heat in the outer portion A, and provides much less heat in the inner portion B, yet enough to significantly reduce the thermal difference, and hence thermal stress, between the inner portion A and the outer portion B. Of course, the spacing of the runs of the heating element could vary within the scope of the disclosure and claims herein.

The heating elements shown in FIGS. 2, 6 and 10 include two conductors and have only one end connected to electrical power, where two wires are connected to the two conductors on one end of the heating element (such as at point A in FIGS. 2, 6 and 10), and the two conductors are terminated at the far end by electrically connecting the two conductors together. The heating elements shown in FIGS. 17-22 are single-conductor heating elements, and therefor require a connection at both ends of the heating element. Thus, heating element 1720 in FIG. 17 includes a first end with a first termination 1750 that provides an electrical transition between the heating element 1720 and a wire 1760 that connects to the controller, and a second end with a second termination 1770 that provides an electrical transition between the heating element 1720 and a wire 1780 that connects to the controller. One suitable single-conductor heating element is a heating element manufactured by Heatizon Systems in Murray, Utah, which can make heating elements (or cables) to a specified length with the needed terminations to wire that can be hooked up to a power source. An example of a suitable heating element is Heatizon Systems part number S-0.6-120V-42F-4.86, which has a length of 41.17 ft (12.55 meters). Other similar heating elements can be made in longer or shorter lengths according to the configuration of the heated surface in radiant furniture and the desired density of the heating element runs.

The heating element 1720 in FIG. 17 makes many runs in the tabletop, and in the most preferred configuration, the heating element 1720 does not overlap itself. Overlapping the heating element would cause a hot spot in the tabletop 1710, and is therefore undesirable in the most preferred implementation. Of course, other implementations are possible where the heating element overlaps within the scope of the disclosure and claims herein. The configuration shown in FIG. 17 allows the wires 1760 and 1780 on both ends of the heating element to exit at the same exit point, shown in FIG. 17 at 1790. The tabletop includes a temperature sensor 1730 that has a connected wire 1740 that also exits the exit point 1790. When the wire 1740 for the temperature sensor 1730 crosses the heating elements, as shown in two places in FIG. 17, the wire is most preferably 0.25 inches (0.6 cm) or more separated from the heating element to reduce the likelihood of the heat from the heating element damaging the wire 1740 from the temperature sensor 1730.

The outer portion A preferably includes an outer perimeter defined by the outer edge of the tabletop 1710 and an inner perimeter defined by the outer edge of the inner portion B. The outer portion A has a density of heating element runs that is much higher near the inner perimeter and outer perimeter than halfway between the inner perimeter and outer perimeter. The temperature sensor 1730 in FIG. 17 is shown approximately half the distance between the outer perimeter and the inner perimeter of the outer region A. Thus, we see from FIG. 17 the density of the heating element runs on both sides of the temperature sensor 1730 is greater than the density of heating element runs at the halfway point where the temperature sensor is located. This is visually apparent in FIG. 17 by the larger gap between the three runs closest to the outer perimeter of the outer region A and the three runs closest to the inner perimeter of the outer region A.

Heating in the tabletop 1710 in FIG. 17 can be specified in watts per square foot (or watts per square meter). Because the density of the runs of the heating element is greater at the outside edge and near the boundary between the outer region A and the inner region B in FIG. 17 than the density between these runs, the heat density at the outer edge and near the boundary between the outer region A and the inner region B in FIG. 17 has a heat density in watts per square foot (or watts per meter) that is most preferably at least 20% greater than the heat density at the midway point in the outer region A, represented in FIG. 17 by the location of the temperature sensor 1730. The heat density in the outer region A is most preferably at least 30% greater than the heat density in the inner region B in FIG. 17.

Figure 18:
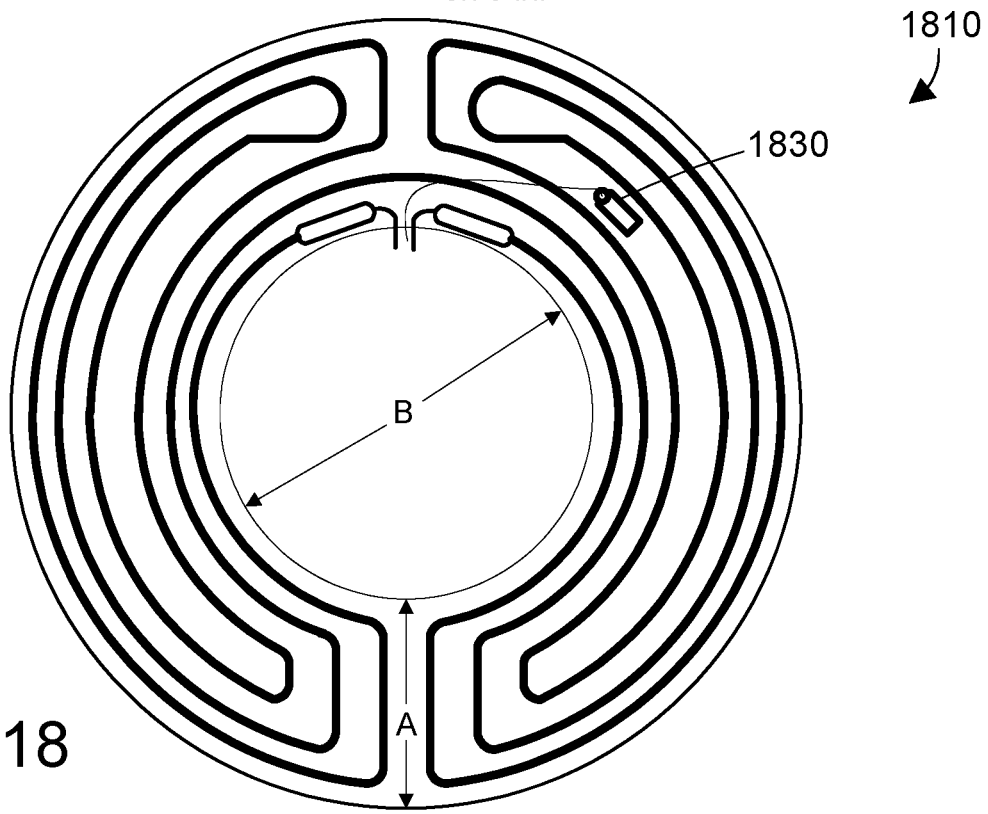
FIG. 18 shows one suitable configuration for heating element runs in a round tabletop that has an open inner portion or that has no runs of heating element in the inner portion.

The tabletop 1810 shown in FIG. 18 has a very similar configuration of heating element runs in the outer portion A, but does not have any concrete material in inner portion B. Tests have shown that the heat needed to make a person comfortable is in the outer portion A. By not pouring the concrete mix in the inner portion B, some advantages are realized. Less of the concrete mix is used, reducing cost. The tabletop 1710 is lighter. The center portion B can be filled with a decorative top that adds to the aesthetic appearance of the tabletop, such as a stained wood surface. Of course, suitable synthetic materials could also be used to fill in the inner portion B. When the material put in the inner portion B is thermally insulating, such as wood or plastic, heat from the outer portion A only minimally transfers to the material in the inner portion B. This allows cool foods such as salads and drinks to be placed on the material in the inner portion B so they are not adversely affected by the heat in the outer region A. In the most preferred implementation, the inner perimeter of the outer portion A includes a lip that is formed when pouring the tabletop such that a decorative piece can be cut to the circular dimension B shown in FIG. 18 with a suitable thickness that will allow the piece to be placed inside the inner portion B, resting on the lip in the tabletop such that the top of the piece is level with the concrete top in the outer portion A.

Testing with various configurations of heating elements has shown that placing the runs of the heating element closer together at both the inside and outside edges of the outer portion A, and placing the runs farther apart in the middle of the outer portion A, as shown in FIG. 18, results in more even heat distribution in the outer portion A. Thus, the three runs closest to the outside edge and the three runs closest to the inside edge have similar spacing, starting with the first run being close to the edge, the second run being a little farther from the first run, and the third run being a little farther from the second run, as shown by the dimensions in FIG. 17. Note, however, the spacing between these two sets of runs is farther apart. The wider space between the two sets of runs avoids hot spots on the tabletop. Stated generally, the heating element is spaced closer to edges and farther in the middle. The temperature sensor 1830 embedded in the tabletop 1810 is preferably located near the center of the outer portion A between the two widest runs of the heating element, as shown in FIG. 18.

While tabletop 1810 in FIG. 18 is discussed above as a table that does not have an inner portion B, and thus provides both an outside and an inside perimeter to the outer portion A, it is equally within the scope of the disclosure and claims herein to provide a tabletop 1810 where the inner portion B is the same concrete mix as the outer portion A, but without any heating element runs. When this is the case, the inner portion B in FIG. 18 is a representation of the part of the tabletop 1810 that does not include any heating element runs. Outer portion A is still represented by the space between the outer edge of the table and inner portion B, but inner portion B designates a region that does not include heating element runs, rather than designating a portion that does not have any concrete mix.

Figure 19:
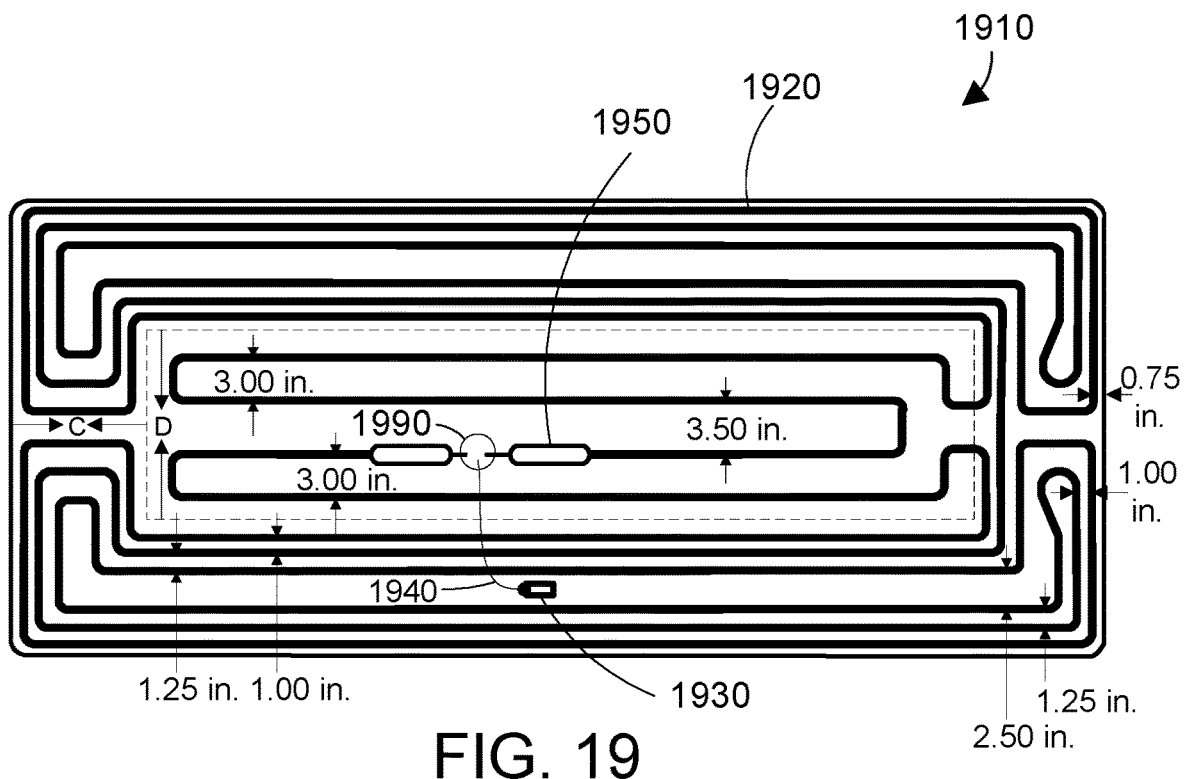
FIG. 19 shows one suitable configuration for heating element runs in a rectangular tabletop.

A rectangular tabletop is shown at 1910 in FIG. 19, which includes an outer portion C and an inner portion D, similar to the outer portion A and the inner portion B shown in FIGS. 17 and 18. The heating element 1920 includes multiple runs that are most preferably configured so they do not cross each other. The spacing of the runs from the outer edge of the tabletop 1910 is similar in spacing to the spacing of the runs shown in FIG. 17. The two ends of the heating element include terminations 1950 that provide wires that exit the tabletop at exit point 1990. A temperature sensor 1930 is connected to a wire 1940 that crosses four runs of the heating element and exits at the exit point 1990, as shown in FIG. 19. As discussed above with reference to FIG. 17, the wire 1940 for the temperature sensor 1930 is preferably placed so it is no closer than 0.25 inches (0.6 cm) from the heating element at the crossing points between wire 1940 and the runs of the heating element. The density of the heating element runs in the inner portion D is significantly less than the density of the heating element runs in the outer portion C, thereby providing significant less heating in the inner portion D, but still providing some heating to reduce the thermal difference between the outer portion C and the inner portion D, thereby reducing the likelihood of cracks in the tabletop caused by thermal stress.

Figure 20:
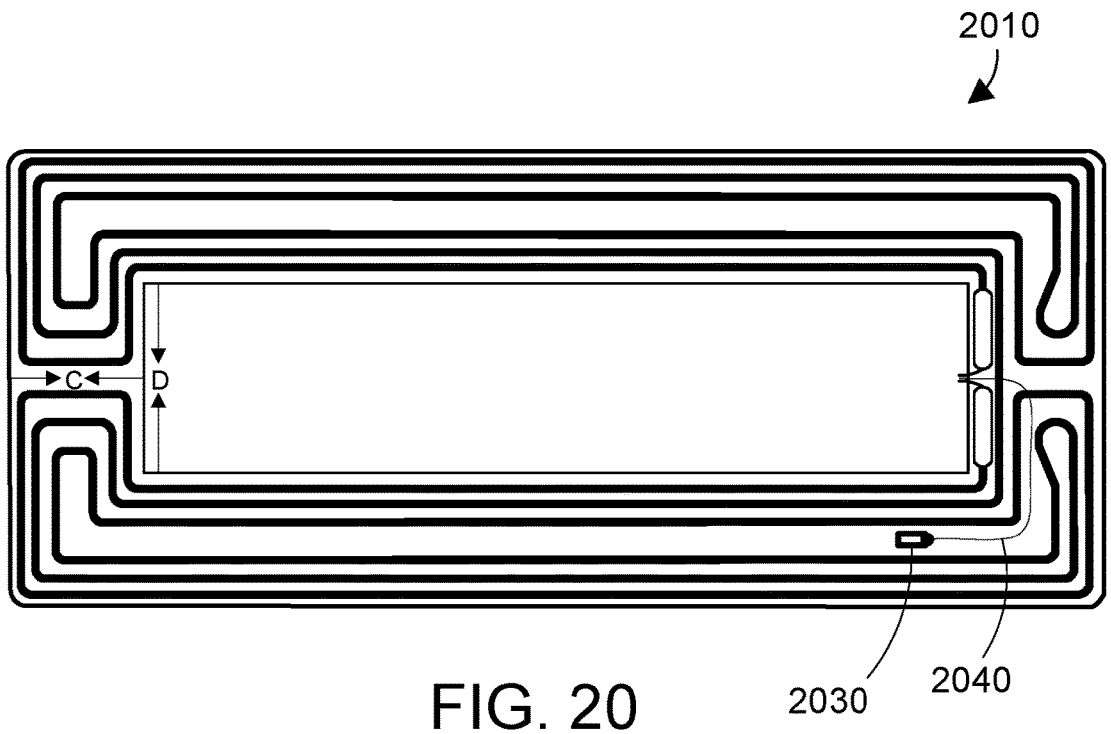
FIG. 20 shows one suitable configuration for heating element runs in a rectangular tabletop that has an open inner portion or that has no runs of heating element in the inner portion.

A tabletop 2010 is shown in FIG. 20 that has heating element runs in the outer portion C very similar to those shown in FIG. 19. However, tabletop 2010 includes the inner portion D that does not have any concrete mix or heating elements. This allows a decorative material such as wood or plastic to be placed within the center portion D, thus providing a very attractive tabletop. The arrangement of the runs of the heating element in FIG. 20 is similar in many ways to the arrangement of the runs in FIG. 18. Both the outer and inner edges of the outer portion C have runs that start close to the edge and are spaced at increasing distances from each other for the first three runs, with a larger gap separating the inner set of three runs from the outer set of three runs. The temperature sensor 2030 is in a different position than the temperature sensor 1930 in FIG. 19 because the tabletop 2010 has a different exit point for the heating element wires and the wire 2040 for the temperature sensor 2030. The wire 2040 only crosses two heating element runs as shown in FIG. 20 before arriving at the exit point. As discussed above, at the point the wire 2040 crosses the heating element runs, the distance between the wire 2040 and the heating element runs is preferably 0.25 inches (0.6 cm) or greater.

While tabletop 2010 in FIG. 20 is discussed above as a table that does not have an inner portion D, and thus provides both an outside and an inside perimeter to the outer portion C, it is equally within the scope of the disclosure and claims herein to provide a tabletop 2010 where the inner portion D is the same concrete mix as the outer portion C, but without any heating element runs. When this is the case, the inner portion D in FIG. 20 is a representation of the part of the tabletop 2010 that does not include any heating element runs. Outer portion C is still represented by the space between the outer edge of the table and inner portion D, but inner portion D designates a region that does not include heating element runs, rather than designating a portion that does not have any concrete mix.

The heated tabletops shown in FIGS. 17 and 19 include a heat density that is greater in the outer portion than in the inner portion. In the most preferred implementation, the heat density in the outer portion A in FIG. 17 and in the outer portion C in FIG. 19 is at least 30% greater than the heat density in the inner portions B and D, respectively.

In addition to heated tabletops, the radiant furniture can also include radiant seating panels that can be used on benches, couches, chairs, etc. Two specific configurations of radiant seating panels are shown at 2110 in FIGS. 21 and 2210 in FIG. 22. The radiant panel 2110 in FIG. 21 has a heating element 2120 in evenly-spaced runs that have terminations 2150 that transition to wires that exit the exit point 2160. The radiant panel 2110 could be used, for example, in a bench or couch. The radiant seating panel 2110 includes a temperature sensor 2130 that is placed between two of the runs of the heating element, and has a wire 2132 that is routed to the exit point 2160. Once again, the spacing between the wire 2132 and the heating element 2120 at the point the two cross is preferably 0.25 inches (0.6 cm) or greater.

Figure 22:
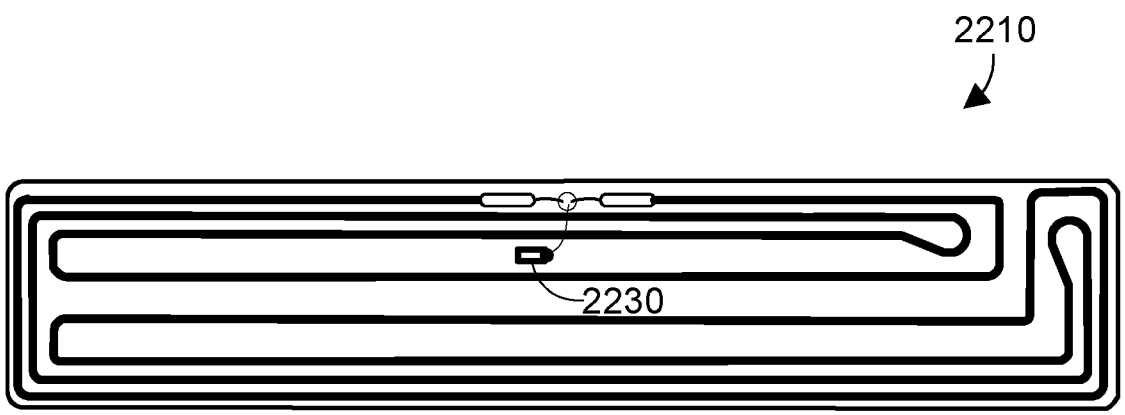
FIG. 22 shows a second suitable configuration for heating element runs in a heated seating panel.

An alternative configuration for a heated seating panel is shown at 2210 in FIG. 22. In one specific embodiment, the spacing of the outer runs in the radiant seating panel 2210 is similar to or the same as the spacing of the outer runs in the tabletop 1910 shown in FIG. 19. This provides three sets of runs on the bottom edge in FIG. 22 that have an increasing spacing from the edge and from each other, and three corresponding sets of runs on the top edge in FIG. 22, with the two sets of three runs separated by runs that have a larger spacing.

Figure 21:
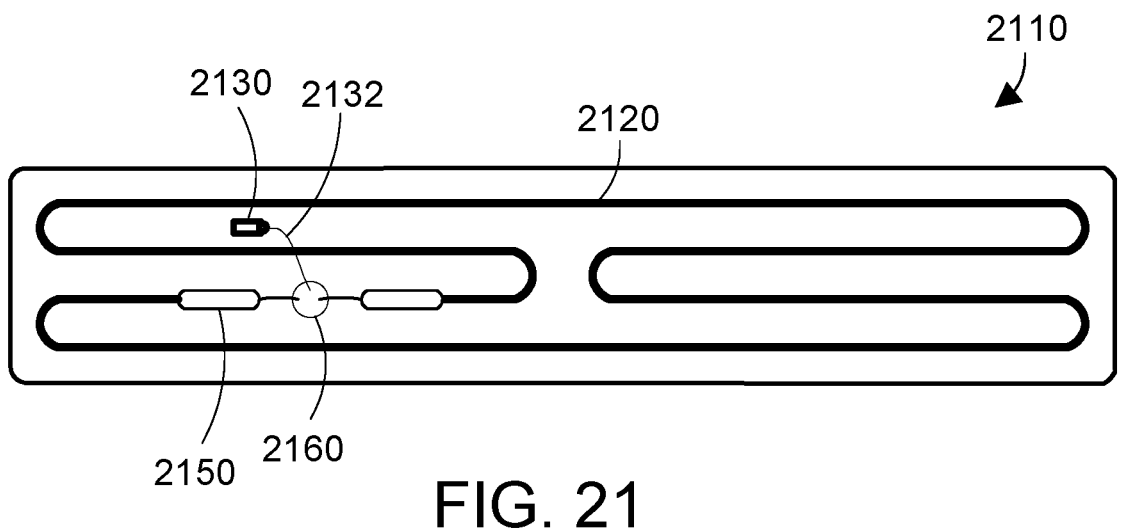
FIG. 21 shows a first suitable configuration for heating element runs in a heated seating panel.

The radiant seating panels 2110 in FIGS. 21 and 2210 in FIG. 22 could be used for a bench that has no back, and thus allows people to sit on both sides of the bench. A radiant seating panel within the scope of the disclosure and claims herein can have any suitable size, shape, and configuration of heating element runs. For example, a bench in the shape of an arch could include a radiant heating panel in the corresponding shape of the arch. A sectional outdoor couch could include an L-shaped radiant seating panel that spans the different components of the sectional couch. A heated seating panel could be configured to cap a half-wall, thereby providing heated seating to those who sit on the half wall. These and other examples are within the scope of the disclosure and claims herein.

Note the heated seating panels 2110 in FIGS. 21 and 2210 in FIG. 22 have different densities of runs of the heating element, which results in different heat densities. Heated seating panel 2110 could represent an exterior bench, such as at a bus stop, where the temperature need not be high but needs to be high enough to melt show and ice that might otherwise accumulate on the bench. Heated seating panel 2210 could represent a heated seating panel in a padded couch. The disclosure and claims herein expressly extend to any suitable density of runs of one or more heating elements in a heated seating panel.

Heated seating panels allow constructing both unpadded and padded radiant furniture. Unpadded furniture can include any suitable bench or other heated seating surface that does not have anything on top, so the heat from the radiant seating panel is transferred directly to the person who sits on the radiant heating panel. Padded furniture can include chairs, couches, sectional couches, ottomans, transit seating, seat wall tops, or other "site furniture" in architectural and landscaping builds, etc. One suitable example for a padded couch is shown at 2300 in FIG. 23. Couch 2300 includes three back cushions 2310, 2320 and 2330 and three bottom cushions 2340, 2350 and 2360. We assume there is a radiant seating panel under the seat cushions 2340, 2350 and 2360 that is not visible in FIG. 23. The result is a heated couch 2300 that provides warmth to people sitting on the couch.

Figure 23:
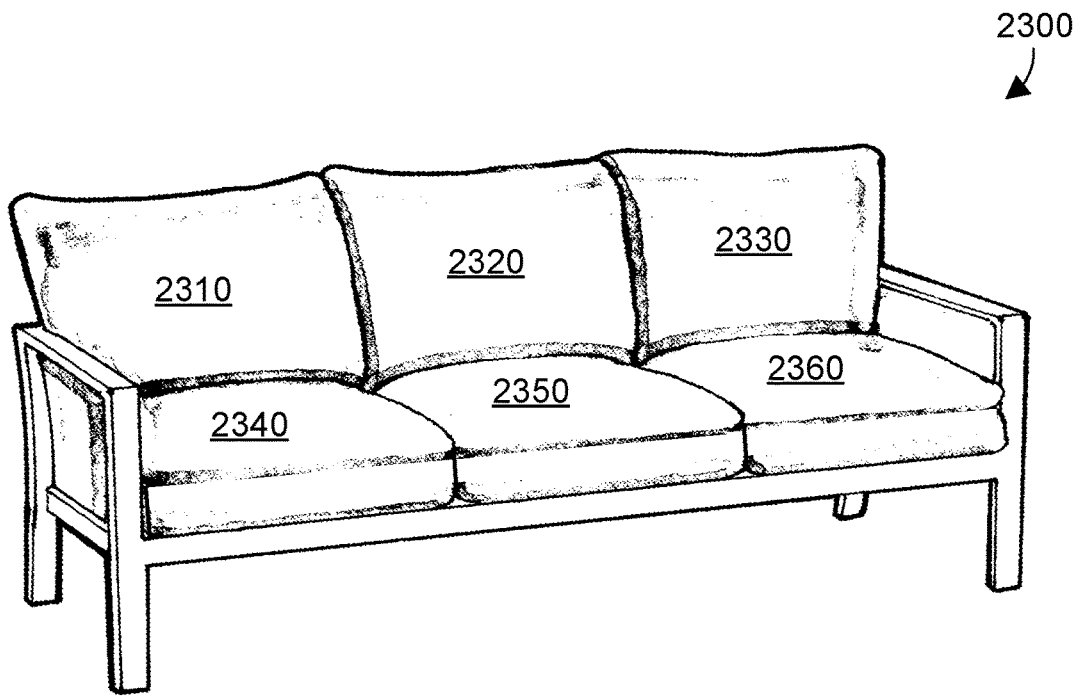
FIG. 23 shows a heated couch.
Figure 24:
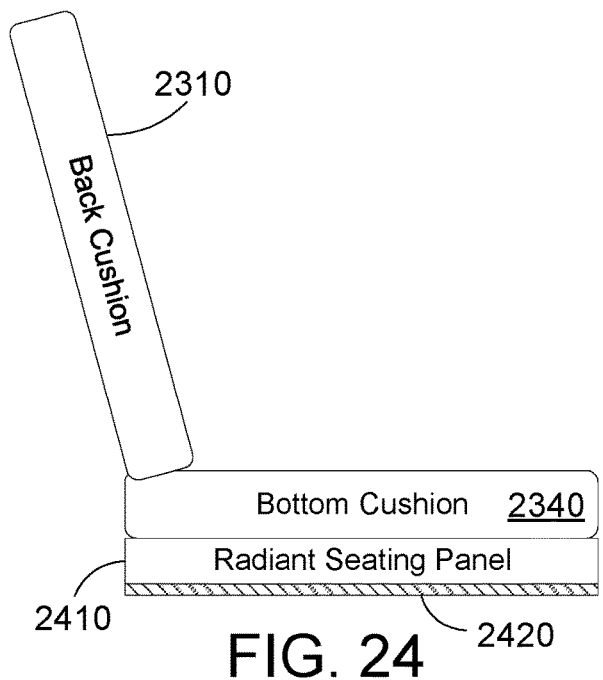
FIG. 24 shows a left end view of the heated couch in FIG. 23 with the structural frame removed for the sake of clarity.

FIG. 24 shows a left side view of the back cushion 2310 and bottom cushion 2340 of couch 2300 in FIG. 23, with the structural frame removed for the sake of clarity. The bottom cushion 2340 sits atop the radiant seating panel 2410, which is supported by the structural frame. The radiant seating panel 2410 includes an insulative layer 2420 that minimizes heat loss from the bottom of the seating panel 2410. One suitable example of insulative layer 2320 is Pro-DeX radiant barrier insulation, which can be applied to the bottom of the radiant seating panel 2410 using a suitable adhesive. For a radiant table, having heat radiate downward from the tabletop can provide comfortable heat to a person sitting at the table, as shown by the arrows facing down in FIG. 1, indicating heat radiating from the bottom of the tabletop 110. For radiant seating panels, however, any heat that escapes in a downward direction is lost heat. The insulative layer 2420 is thus placed at the bottom of the radiant seating panel 2410 to minimize heat loss in the downward direction. Note also a similar insulative layer could be applied to the underside of the center portions of the tables shown in FIGS. 17 and 19 to minimize heat loss and could also be applied to the center portions of the tables shown in FIGS. 18 and 20 when the inner portions include the same concrete mix as the outer portions.

Figure 25:
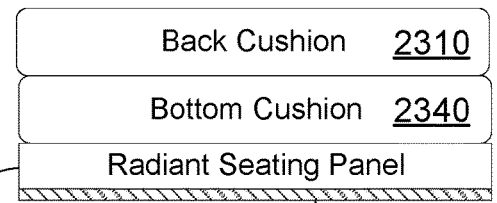
FIG. 25 shows the left end view of the heated couch in FIG. 23 when the back cushion is pivoted down to overlie the bottom cushion.

Heat from the radiant seating panel 2410 radiates up through the bottom cushion 2340 to a person sitting on the bottom cushion 2340. The bottom cushion is preferably made of materials that allow heat to easily radiate from the radiant seating panel 2410 through the bottom cushion 2340 to a person sitting on the bottom cushion 2340. The back cushion 2310 in FIG. 24 is shown in a position for someone to sit down on the bottom cushion 2340. The back cushion 2310 can be pivoted down to overlie the bottom cushion 2340, as shown in FIG. 25. In this configuration the back cushion 2310 serves as an insulator to maintain heat radiated from the radiant seating panel 2410 in the bottom cushion 2340. The back cushion 2310 can be attached to the frame of the couch when in the sitting position shown in FIG. 24 using straps and/or suitable fasteners such as snaps or hook and loop fasteners. In addition, the back cushion 2310 and bottom cushion 2340 can be attached together at the back using straps and/or suitable fasteners such as snaps or hook and loop fasteners.

Figure 26:
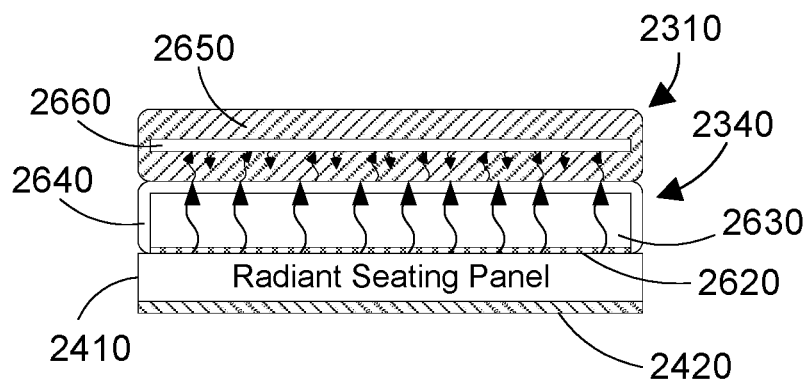
FIG. 26 is a side cross-sectional view of the items shown in FIG. 25 to show their construction for one specific implementation.
Figure 27:
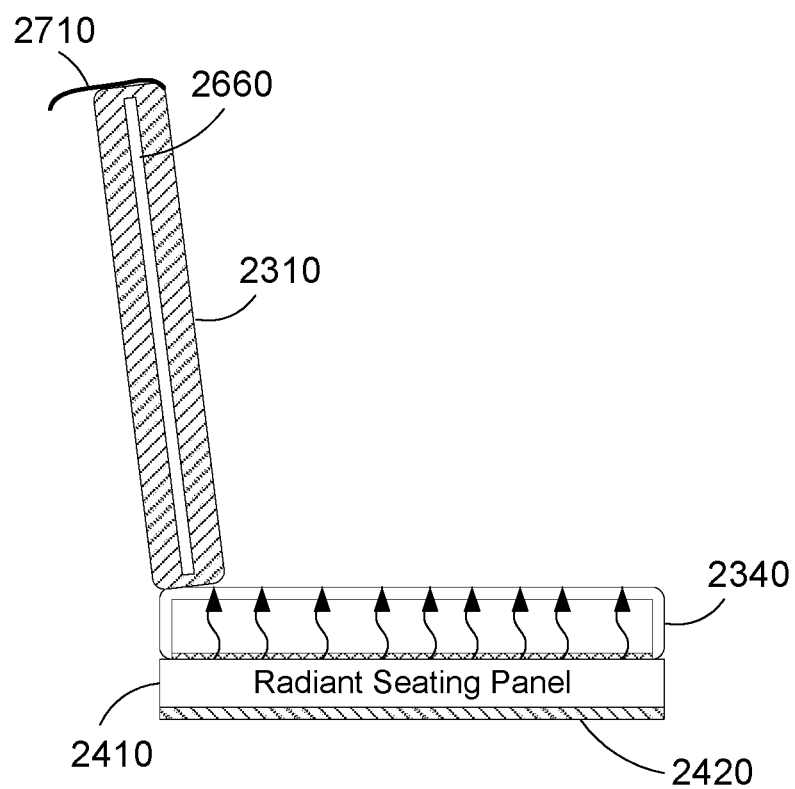
FIG. 27 is a side cross-sectional view of the items shown in FIG. 24 to show their construction for one specific implementation.

Specific configurations of the back cushion 2310 and bottom cushion 2340 within the scope of preferred embodiments are shown in the cross-sectional views in FIGS. 26 and 27. The bottom cushion 2340 preferably has a mesh bottom surface 2620 that allows heat to easily pass from the radiant seating panel upwards into the bottom cushion 2340. Phifertex is one suitable type of vinyl mesh for mesh bottom surface 2620. The bottom cushion 2340 has an interior portion 2630 that is preferably open-cell foam, thereby allowing heat to easily rise from the radiant seating panel 2410 through the bottom cushion 2340. Note, however, other materials may also be used. For example, a closed-cell foam may not transfer heat with the same efficiency as open cell foam, but the lesser heat transfer may be a tolerable tradeoff for having a more comfortable bottom cushion 2340. The open cell foam is preferably covered by an outdoor fabric 2640 that is preferably polyester or acrylic that is sewn or otherwise attached to the mesh bottom surface 2620. The result is a bottom pad 2340 that transfers heat well and will dry quickly when it gets wet.

The back cushion 2310 preferably includes an exterior of outdoor fabric such as polyester or acrylic, with an interior 2650 made of batting or quilting material that provides padding. In one suitable implementation as shown in FIG. 26, the interior 2650 may have one or more layers of quilting material above and one or more layers of quilting material below a reflective barrier 2660 to provide a padded back cushion 2310. The reflective barrier 2660 redirects heat received from the radiant seating panel 2410 through the bottom cushion 2630 back to the bottom cushion 2630, as shown by the arrows facing down in FIG. 26, which results in the bottom cushion 2630 and lower portion of the back cushion 2310 holding most of the heat radiated by the radiant seating panel 2410. One suitable reflective material that could be used for the reflective barrier 2660 is Polytherm. The construction of the bottom cushion 2340 and back cushion 2310 enhance the function of a heated couch. The back cushion 2310 can be pivoted down on top of the bottom cushion 2630 as shown in FIG. 26. In this position, the back cushion 2310 acts as an insulator to trap heat released by the radiant seating panel 2410 until a person wants to sit down, at which time the person pivots the back cushion 2310 up to the position shown in FIG. 27 and sits down on the bottom cushion 2340. Because the back cushion 2310 was reflecting the heat from the radiant seating panel as shown in FIG. 26, both the bottom cushion 2340 and the back cushion 2310 will feel warm to the person who sits down. The reflective barrier 2660 will then reflect the body warmth of the person who sits down, thereby maintaining a temperature in the back cushion 2310 that is higher than a cooler ambient air temperature. The back cushion 2310 can thus act as a clamshell top, holding in the heat when in the lower position as shown in FIG. 26 until a person wants to sit down, at which time the back cushion is pivoted to the position shown in FIG. 27, allowing the person to sit down. The back cushion 2310 preferably includes one or more straps 2710 that allow the back cushion 2310 to be tied or otherwise attached to a structural frame of the couch. The strap 2710 may include any suitable attachment device, including without limitation snaps, hooks and hook-and-loop fasteners.

Figure 28:
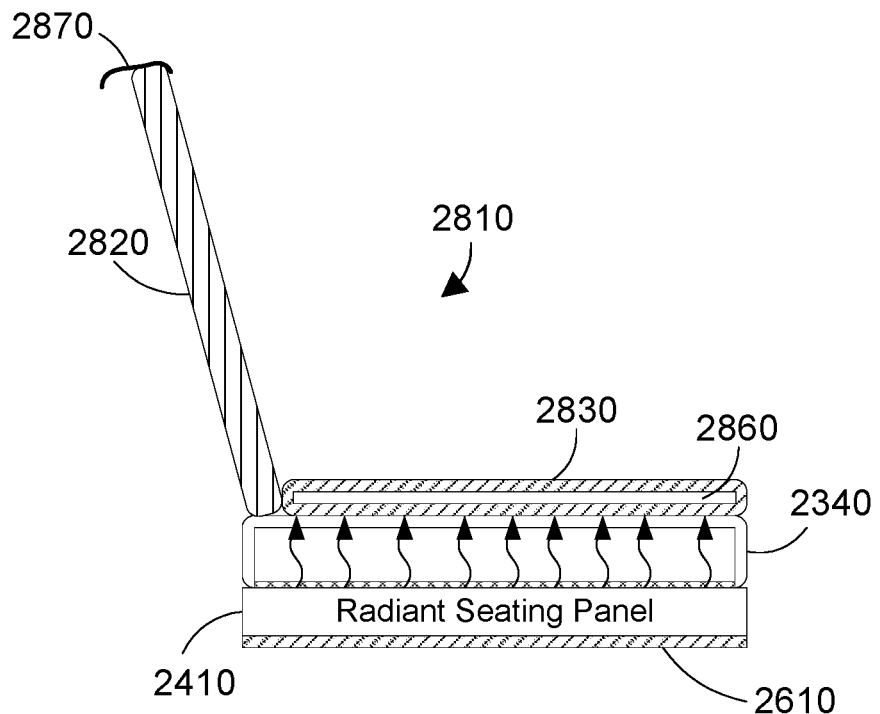
FIG. 28 is a side cross-sectional view of an alternative embodiment for the back cushion that includes a fixed portion and a movable portion, with the movable portion in a lower position overlying the bottom cushion.
Figure 29:
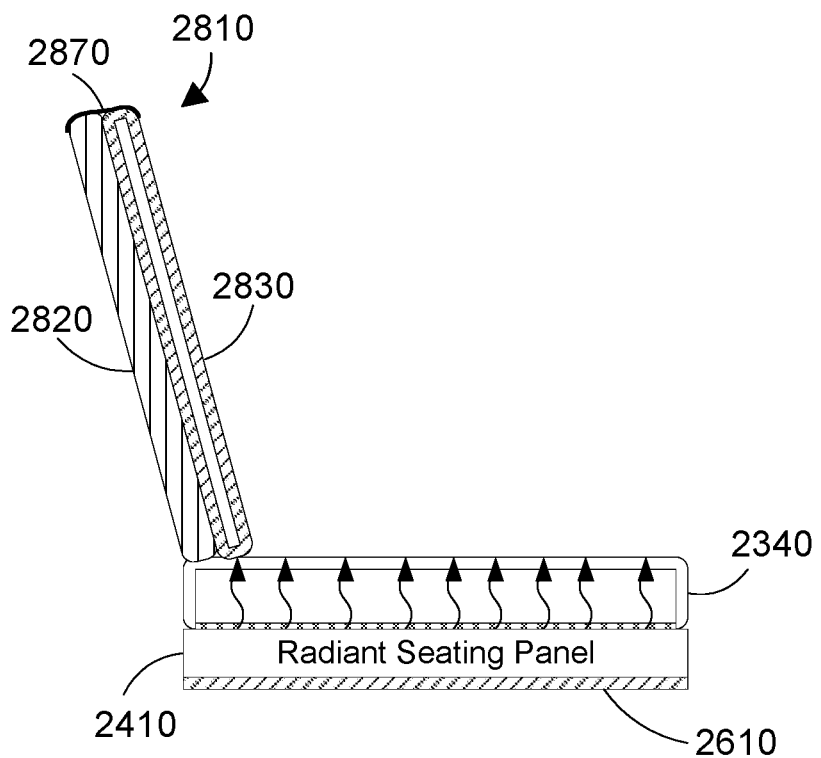
FIG. 29 is a side cross-sectional view of the alternative embodiment shown in FIG. 28 with the movable portion in an upper position next to the fixed portion.

An alternative configuration for the back cushion 2310 is shown in FIGS. 28 and 29. The top cushion 2310 in FIGS. 26 and 27 is a single piece, while the back cushion 2810 shown in FIGS. 28 and 29 comprises two parts, a fixed back portion 2820 that is preferably attached to a structural frame for the couch, and a movable back portion 2830 that can be pivoted between a lower position shown in FIG. 28 and an upper position shown in FIG. 29. The combination of the fixed back portion 2820 and the movable back portion 2830 collectively make up the back cushion 2810. The movable back portion 2830 can have a construction similar to back portion 2310 shown in FIGS. 26 and 27, with an outdoor fabric on the exterior, multiple layers of quilting material on the interior for padding, and a reflective barrier layer 2860. In the most preferred implementation, the thickness of the movable back portion 2830 is approximately half the thickness of the back portion 2310 shown in FIGS. 26 and 27, and the thickness of the fixed back portion 2820 is approximately the same thickness, resulting in an overall thickness for the back cushion 2810 in FIG. 29 that is comparable to the thickness for the back cushion 2310 in FIGS. 26 and 27. The movable back portion 2830 can be pivoted between the lower position shown in FIG. 28 and the upper position shown in FIG. 29. The movable back portion 2830 thus provides a clamshell-like function, holding in heat in the bottom cushion 2340 when in the lower position shown in FIG. 28, then providing a heated cushion for a person's back and bottom when the person pivots the movable back portion 2830 to the upper position shown in FIG. 29 and sits down.

The movable back portion 2830 may be held in place against the fixed back portion 2820 via one or more straps 2870 or other attachment devices, which can include without limitations snaps, hooks and hook-and-loop fasteners, which can attach to either the fixed back portion 2820 or can attach directly to a structural frame for the couch.

The heated surfaces for radiant furniture as disclosed herein can be made in any suitable thickness according to the particular application. For example, tabletops could be relatively thick to provide a strong and stable surface. Radiant seating panels that are covered by cushions could be relatively thin to minimize the weight in a heated couch, for example. In the most preferred embodiments, the thickness of the heated surfaces disclosed herein are preferably from 0.75 to 3 inches (19 to 76 mm), are more preferably 1.0 to 2.5 inches (25 to 64 mm), and are most preferably 1.25 to 2.0 inches (32 to 51 mm). In some applications, such as seating on half walls and other site furniture, the thickness could be much thicker than even 3 inches (76 mm). For example, a half wall design as a seating area could have a heated surface thickness of 6 inches (15 cm) or more. The disclosure and claims herein extend to any suitable thickness for the heated surfaces in radiant furniture.

While circular tables, rectangular tables, and rectangular seating panels are shown in the drawings as suitable examples of radiant furniture, the disclosure and claims herein expressly extend to any suitable furniture piece with a heated surface in any suitable shape or size. For example, square, rectangular, oval, hexagon, octagon, arched-shaped, or other shaped furniture can be radiant furniture as disclosed herein. Picnic tables, site furniture, and bench seats are radiant furniture as disclosed herein. Chair backs and chair seats are radiant furniture as disclosed herein. One skilled in the art will realize that virtually any piece of furniture could be made with a heated surface, and could thus be radiant furniture as disclosed herein.

Radiant furniture as disclosed herein has many advantages when compared to propane space heaters. The cost of heating using radiant furniture is significantly less than the cost of burning propane in propane space heaters. Radiant furniture provides very comfortable heat right where it is needed, thereby providing more uniform heat and avoiding having some people too hot and others too cold, which is common for propane space heaters. In addition, propane space heaters burn propane, and the burning typically causes very hot surfaces that are a burn hazard. Electric space heaters have most of the same burn hazards and utilize extremely high wattage. Radiant furniture, on the other hand, is comfortably warm without ever creating a burn hazard. Propane space heaters can be difficult to light, and both propane and electric space heaters typically require periodic maintenance, such as changing out the propane tank, cleaning the heater, replacing elements, etc. Radiant furniture, in contrast, requires virtually no periodic maintenance. Radiant furniture as disclosed and claimed herein therefore provides a heating solution that is vastly superior to known propane or electric space heaters for the many reasons discussed above.

Radiant furniture made of a concrete mix includes one or more heating elements or hot water supplied hydronic tubing that provide comfortable radiant heat. Tabletops can be heated to a temperature that is comfortable for people seated at the table in a cool or cold outdoor setting. Other tabletops can be heated to a lower temperature for use in a greenhouse or at an indoor location requiring a warm table, such as in a restaurant with the air conditioning set to a cold setting. Benches and seats can be heated to provide comfortable heated seating. Combinations can also be used together, such as a heated tabletop with heated seats. A controller senses the temperature of the furniture and the ambient temperature, then applies power to one or more heating elements in the furniture according to programmed temperature thresholds to provide comfortable radiant heat from the furniture. The controller includes a calibration mode that allows calibrating the controller to a particular heated surface. The controller further comprises a knob that determines an operating mode for the controller and allows adjusting a temperature threshold for the heated surface up or down.

While the specific examples herein disclose a controller driving a single heating element in a heated surface, these are shown by way of example and are not limiting. The disclosure and claims herein expressly extend to a controller that can drive multiple heated surfaces. For example, a radiant couch could include a radiant seating panel as shown in FIGS. 26-29, and could additionally include a second radiant heating panel that heats the top cushion, thereby providing both a heated bottom and back. A sectional couch could have two separate radiant seating panels that are both driven by the same controller. The disclosure and claims herein extend to a controller that can control multiple heated surfaces, which can be either in the same piece of radiant furniture or in different pieces of radiant furniture.

The disclosure and claims herein support an apparatus comprising: a first temperature sensor interface; a second temperature sensor interface; a heating element interface; and controller logic that determines from a first temperature sensor in a heated surface that is coupled to the first temperature sensor interface when a temperature of the heated surface is less than a first temperature threshold, and in response, applies power to a heating element in the heated surface that is coupled to the heating element interface, and when the temperature of the heated surface is not less than the first temperature threshold, removes power from the heating element in the heated surface, wherein the controller logic determines from a second temperature sensor coupled to the second temperature sensor interface a temperature in an ambient environment external to the heated surface, and dynamically adjusts the first temperature threshold as temperature of the ambient environment changes.

The disclosure and claims herein further support radiant furniture comprising: (A) a heated panel comprising: a concrete mix; a heating element embedded in the concrete mix that provides a plurality of non-overlapping runs in the heated panel; and a first temperature sensor that determines temperature of the heated panel; (B) a second temperature sensor that determines temperature of an ambient environment external to the heated panel; (C) a controller that comprises: a knob that includes an OFF position, and ON position, and an AUTO position between the OFF position and the ON position; a mode selection circuit that specifies one of a plurality of operating modes that each corresponds to a different type of heated surface, and further specifies a calibration mode; a table of ambient temperatures and corresponding temperature thresholds for each type of heated surface selectable by the mode selection circuit; controller logic that reads the mode selection circuit and determines from the mode selection circuit a type of heated surface based on the selected operating mode and when the controller logic is in calibration mode; when the controller logic is in calibration mode, the controller logic: sets a temperature threshold to a default temperature threshold for the selected operating mode; receives input from a knob that includes a plurality of positions that specify an offset for the default temperature threshold; and writes a temperature correction value corresponding to the input from the knob to a non-volatile memory in the controller.

The disclosure and claims herein additionally support radiant furniture comprising: a heated panel comprising a first temperature sensor that determines temperature of the heated panel; a second temperature sensor that determines temperature of an ambient environment external to the heated panel; a controller that comprises: a knob that includes an OFF position, and ON position, and an AUTO position between the OFF position and the ON position; a mode selection circuit that specifies one of a plurality of operating modes that each corresponds to a different type of heated surface, and further specifies a calibration mode; a table of ambient temperatures and corresponding temperature thresholds for each type of heated surface selectable by the mode selection circuit; controller logic that reads the mode selection circuit and determines from the mode selection circuit a type of heated surface based on the selected operating mode and when the controller logic is not in calibration mode; when the controller logic is not in calibration mode and the knob is between the OFF and the ON position, the controller logic reads the temperature of the ambient environment from the second temperature sensor, determines a corresponding temperature threshold corresponding to the ambient temperature in the table, and sets a temperature threshold for the controller logic that is adjusted by an adjustment value, if any, on the knob.

The disclosure and claims herein further support a method for providing radiant heat in a furniture piece comprising: providing a furniture piece comprising: a heated surface that includes a first heating element and a first temperature sensor that determines temperature of the heated surface;

providing a second temperature sensor that determines temperature of an ambient environment external to the heated surface; and providing a controller coupled to the first heating element, to the first temperature sensor, and to the second temperature sensor, the controller comprising controller logic that determines from the second temperature sensor a temperature of the ambient environment, then determines from a table of ambient temperatures and corresponding temperature thresholds a target temperature threshold that corresponds to the temperature of the ambient environment, then adjusts the target temperature threshold according to a value on a knob coupled to the controller logic.

One skilled in the art will appreciate that many variations are possible within the scope of the claims. Thus, while the disclosure is particularly shown and described above, it will be understood by those skilled in the art that these and other changes in form and details may be made therein without departing from the spirit and scope of the claims.

The invention claimed is:

1. Radiant furniture comprising:
 (A) a heated panel comprising:
  a concrete mix;
  a heating element embedded in the concrete mix that provides a plurality of non-overlapping runs in the heated panel; and
  a first temperature sensor that determines temperature of the heated panel;
 (B) a second temperature sensor that determines temperature of an ambient environment external to the heated panel;
 (C) a controller that comprises:
  a knob that includes an OFF position, and ON position, and an AUTO position between the OFF position and the ON position;
  a mode selection circuit that specifies one of a plurality of operating modes that each corresponds to a different type of heated surface, and further specifies a calibration mode;
  a table of ambient temperatures and corresponding temperature thresholds for each type of heated surface selectable by the mode selection circuit;
  controller logic that reads the mode selection circuit and determines from the mode selection circuit a type of heated surface based on the selected operating mode and when the controller logic is in calibration mode;
  when the controller logic is in calibration mode, the controller logic:
   sets a temperature threshold to a default temperature threshold for the selected operating mode;
   receives input from a knob that includes a plurality of positions that specify an offset for the default temperature threshold; and
   writes a temperature correction value corresponding to the input from the knob to a non-volatile memory in the controller.

2. The radiant furniture of claim 1 wherein, when the controller logic is not in calibration mode and the knob is between the OFF and the ON position and points to an adjustment value, the controller logic reads the temperature of the ambient environment from the second temperature sensor, determines a corresponding temperature threshold corresponding to the ambient temperature in the table, and sets a temperature threshold for the controller logic that is adjusted by the temperature correction value and the adjustment value on the knob.

3. The radiant furniture of claim 2 wherein, when the controller logic is not in calibration mode and the knob is in the ON position, the controller logic reads a default temperature threshold corresponding to the selected operating mode, and sets the temperature threshold for the controller logic to the default temperature threshold adjusted by the temperature correction value.

4. Radiant furniture comprising:
 a heated panel comprising a first temperature sensor that determines temperature of the heated panel;
 a second temperature sensor that determines temperature of an ambient environment external to the heated panel;
 a controller that comprises:
  a knob that includes an OFF position, and ON position, and an AUTO position between the OFF position and the ON position;
  a mode selection circuit that specifies one of a plurality of operating modes that each corresponds to a different type of heated surface, and further specifies a calibration mode;
  a table of ambient temperatures and corresponding temperature thresholds for each type of heated surface selectable by the mode selection circuit;
  controller logic that reads the mode selection circuit and determines from the mode selection circuit a type of heated surface based on the selected operating mode and when the controller logic is not in calibration mode;
  when the controller logic is not in calibration mode and the knob is between the OFF and the ON position and points to an adjustment value, the controller logic reads the temperature of the ambient environment from the second temperature sensor, determines a corresponding temperature threshold corresponding to the ambient temperature in the table, and sets a temperature threshold for the controller logic that is adjusted by the adjustment value on the knob.

5. The radiant furniture of claim 4 wherein the temperature threshold is further adjusted by a temperature correction value for the heated panel determined during calibration of the controller to the heated panel.

6. A method for providing radiant heat in a furniture piece comprising:
 providing the furniture piece comprising:
  a heated surface that includes a first heating element and a first temperature sensor that determines temperature of the heated surface;
 providing a second temperature sensor that determines temperature of an ambient environment external to the heated surface; and
 providing a controller coupled to the first heating element, to the first temperature sensor, and to the second temperature sensor, the controller comprising controller logic that determines from the second temperature sensor a temperature of the ambient environment, then determines from a table of ambient temperatures and corresponding temperature thresholds a target temperature threshold that corresponds to the temperature of the ambient environment, then adjusts the target temperature threshold according to a value on a knob coupled to the controller logic.

7. The method of claim 6 wherein when the temperature of the heated surface is less than the adjusted target temperature threshold, the controller applies power to the heating element in the heated surface, and when the temperature of the heated surface is not less than the adjusted target temperature threshold, the controller removes power from the heating element in the heated surface.

* * * * *